(12) United States Patent
Bennett et al.

(10) Patent No.: US 10,003,525 B2
(45) Date of Patent: Jun. 19, 2018

(54) METHODS AND APPARATUS TO PROVIDE REDUNDANCY IN A PROCESS CONTROL SYSTEM

(71) Applicant: Fisher-Rosemount Systems, Inc., Round Rock, TX (US)

(72) Inventors: William Bennett, Round Rock, TX (US); Joel Nicholas Ohmart, Round Rock, TX (US); Dirk Thiele, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 591 days.

(21) Appl. No.: 14/541,932

(22) Filed: Nov. 14, 2014

(65) Prior Publication Data

US 2016/0142283 A1    May 19, 2016

(51) Int. Cl.
*G06F 15/173*     (2006.01)
*H04L 12/707*    (2013.01)
*H04L 29/08*     (2006.01)
*H04L 12/703*    (2013.01)

(52) U.S. Cl.
CPC ............ *H04L 45/22* (2013.01); *H04L 67/10* (2013.01); *H04L 67/16* (2013.01); *H04L 45/28* (2013.01)

(58) Field of Classification Search
CPC .................................. H04L 45/22; H04L 45/28
See application file for complete search history.

(56) References Cited

U.S. PATENT DOCUMENTS

| | | | | |
|---|---|---|---|---|
| 6,392,990 | B1* | 5/2002 | Tosey | H04L 12/2697 370/218 |
| 2010/0150012 | A1* | 6/2010 | Lee | H04L 12/2856 370/252 |
| 2010/0157813 | A1* | 6/2010 | Matsuura | H04L 41/06 370/242 |
| 2012/0008507 | A1* | 1/2012 | Kano | H04L 12/4641 370/242 |
| 2012/0155249 | A1* | 6/2012 | Manickavasagam | H04L 1/24 370/221 |

\* cited by examiner

*Primary Examiner* — Brian Whipple
(74) *Attorney, Agent, or Firm* — Hanley, Flight & Zimmerman, LLC

(57) ABSTRACT

Methods and apparatus to provide redundancy in a process control system are disclosed. An example method includes receiving, at a first network host, first integrity messages transmitted from a second network host over a first network. The method includes detecting a network failure over a first communication path between a first network interface of the first network host and a second network interface of the second network host via first network when a first network interface of the first network host fails to receive one of the first integrity messages expected from a first network interface of the second network host. The method includes automatically establishing a second communication path between the first network host and the second network host in response to the detected network failure.

20 Claims, 13 Drawing Sheets

800

| | 802 | 804 | 806 | 808 | | 810 |
|---|---|---|---|---|---|---|
| TIME | TRANSMITTING HOST | NETWORK ASSOCIATED WITH SOURCE INTERFACE | IDENTIFYING INFORMATION | INTEGRITY INFORMATION | | |
| | | | | Peer | Primary Status | Secondary Status |
| T1 | Host A | Primary | Host A information | - | - | - |
| T2 | Host B | Primary | Host B information | A | G | - |
| T3 | Host C | Primary | Host C information | A<br>B | G<br>G | -<br>- |
| T4 | Host A | Secondary | Host A information | B<br>C | G<br>G | -<br>- |
| T5 | Host B | Secondary | Host B information | A<br>C | G<br>G | G<br>- |
| T6 | Host C | Secondary | Host C information | A<br>B | G<br>G | G<br>G |
| T7 | Host A | Primary | Host A information | B<br>C | G<br>G | G<br>G |
| T8 | Host B | Primary | Host B information | A<br>C | G<br>G | G<br>G |
| T8.5 | Connection of NIC1 of Host B to the Primary network fails | | | | | |
| T9 | Host C | Primary | Host C information | A<br>B | G<br>G | G<br>G |
| T10 | Host A | Secondary | Host A information | B<br>C | G<br>G | G<br>G |
| T11 | Host B | Secondary | Host B information | A<br>C | G<br>B | G<br>G |
| T12 | Host C | Secondary | Host C information | A<br>B | G<br>B | G<br>G |
| T13 | Host A | Primary | Host A information | B<br>C | G<br>G | G<br>G |
| T14 | Host B | Primary | Nothing delivered | Nothing delivered | | |
| T15 | Host C | Primary | Host C information | A<br>B | G<br>B | G<br>G |
| T16 | Host A | Secondary | Host A information | B<br>C | B<br>G | G<br>G |
| T17 | Host B | Secondary | Host B information | A<br>C | B<br>B | G<br>G |
| T18 | Host C | Secondary | Host C information | A<br>B | G<br>B | G<br>G |
| T19 | Host A | Primary | Host A information | B<br>C | B<br>G | G<br>G |
| T20 | Host B | Primary | Nothing delivered | Nothing delivered | | |

FIG. 8

| TIME | TRANSMITTING HOST | NETWORK ASSOCIATED WITH SOURCE INTERFACE | IDENTIFYING INFORMATION | INTEGRITY INFORMATION | | |
|---|---|---|---|---|---|---|
| | | | | Peer | Primary Status | Secondary Status |
| T1 | Host A | Primary | Host A information | - | - | - |
| T2 | Host A | Secondary | Host A information | - | - | - |
| T3 | Host B | Primary | Host B information | A | G | G |
| T4 | Host B | Secondary | Host B information | A | G | G |
| T5 | Host C | Primary | Host C information | A B | G G | G G |
| T6 | Host C | Secondary | Host C information | A B | G G | G G |
| T7 | Host A | Primary | Host A information | B C | G G | G G |
| T8 | Host A | Secondary | Host A information | B C | G G | G G |

FIG. 9

METHODS AND APPARATUS TO PROVIDE REDUNDANCY IN A PROCESS CONTROL SYSTEM

FIELD OF THE DISCLOSURE

This disclosure relates generally to process control systems and, more particularly, to methods and apparatus to provide redundancy in a process control system.

BACKGROUND

Process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms.

Information from the field devices and/or the controllers is usually made available over a data highway or communication network to one or more other hardware devices, such as operator workstations, personal computers, data historians, report generators, centralized databases, etc. Such devices are typically located in control rooms and/or other locations remotely situated relative to the harsher plant environment. These hardware devices, for example, run applications that enable an operator to perform any of a variety of functions with respect to the process of a process control system, such as viewing the current state of the process, changing an operating state, changing settings of a process control routine, modifying the operation of the process controllers and/or the field devices, viewing alarms generated by field devices and/or process controllers, simulating the operation of the process for the purpose of training personnel and/or evaluating the process, etc.

The combination of technology advances in computer architecture, networking, and virtualization has enabled the development of effective, easy to manage, virtualized computing environments that can implement certain control systems. That is, the workstations, personal computers, and other hardware devices used in a traditional control system may be replaced with virtual machines implemented in a virtual process control environment. End users access the applications and software implemented on such virtual machines via thin clients connected to the virtual system. In this manner the significant cost and complexity of acquiring, configuring, and maintaining all the hardware components that would traditionally be required can be reduced.

BRIEF DESCRIPTION OF THE DRAWINGS

FIG. 8 is a table illustrating example time-lapsed changes to integrity messages transmitted by each of the network hosts of FIG. 4 during an initial discovery of the network hosts and surrounding the network failure of FIG. 6.

FIG. 9 is a table illustrating different example time-lapsed changes to integrity messages transmitted by each of the network hosts of FIG. 4 during an initial discovery of the network hosts.

DETAILED DESCRIPTION

Figure 1:
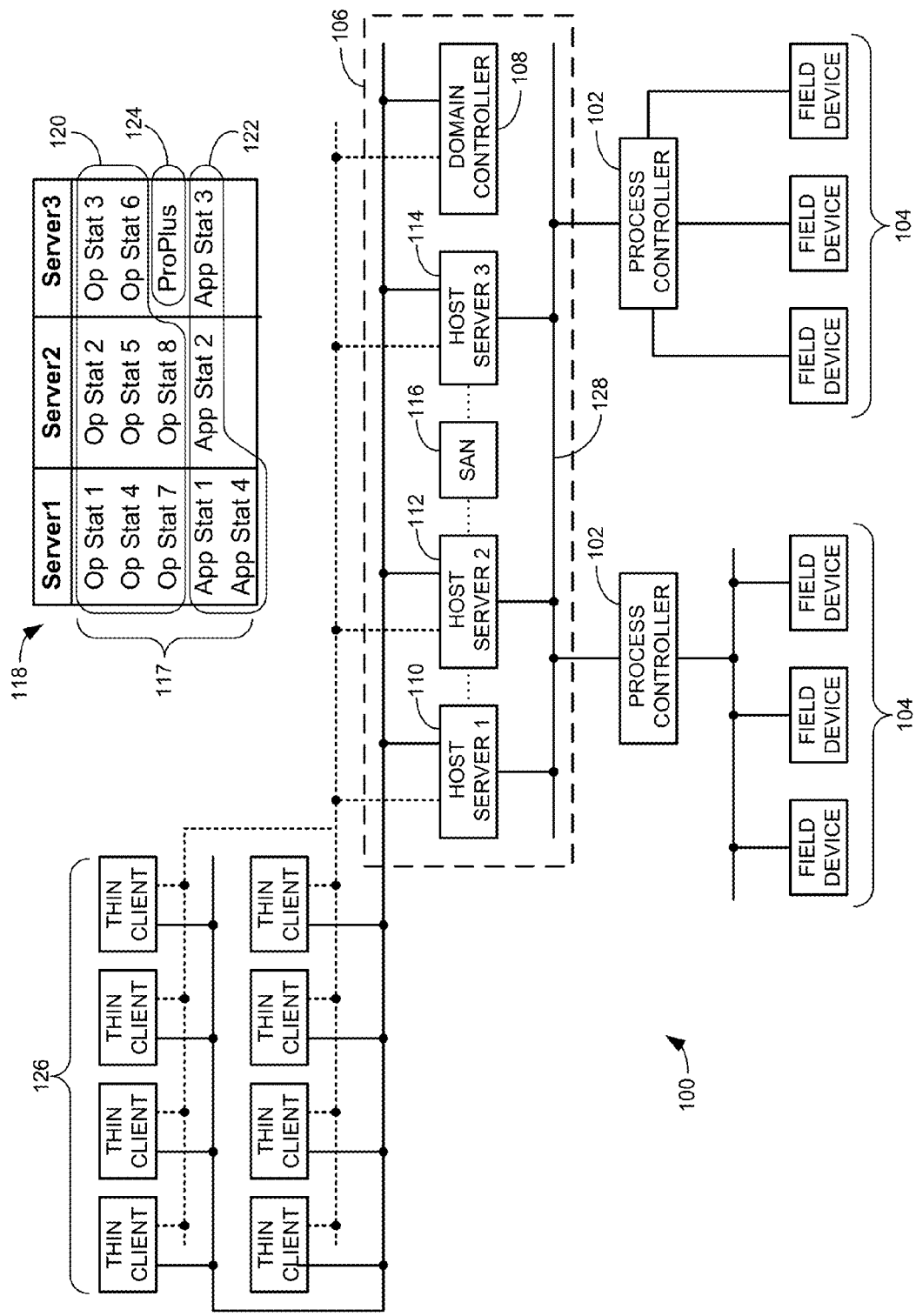
FIG. 1 is a schematic illustration of an example process control system within which the teachings of this disclosure may be implemented.

Reliability is a common concern in the implementation of process control systems and is especially a concern with virtualized control systems where the many traditionally separate workstations and other computer components are all implemented as virtual machines (VMs) on a cluster of host servers. To address these concerns, hardware manufacturers offer hardware solutions for increased reliability such as storage area network (SAN) devices with redundant disk arrays, controllers, and power supplies. Multiple host servers are usually clustered with one highly redundant SAN to increase availability of the overall system and allow room for maintenance, such as component upgrade or replacement without the need to shut down the entire physical system. State of the art operating systems such as Windows Server 2012 facilitate moving VMs from one part of the physical system (e.g. hard drive) to another part of the system or even to an external backup system while the VM continues to run and without any noticeable impact to the operation or communication of the applications or user interactions that may be ongoing on the VM. Such solutions increase the availability of a wide variety of virtual machines such as email servers, web servers and other back end servers that can be accessed via Ethernet by software clients installed on external computer nodes or network hosts such as thin clients.

Many traditional (i.e., physical) control systems have many operator facing software components that are an integral part of the system such as operator interface applications, asset management applications, alarm management applications, etc. These components execute a considerable amount of business logic and use proprietary protocols to ensure high availability when communicating to the other components of the control system. For example, an operator station is often in communication with multiple controllers and/or historians in a control system. In such examples, if a connection is lost between the operator station and a particular historian, the operator station may still be able to retrieve any desired historical data by accessing the information from another historian. Likewise, if a connection is lost between the operator station and a particular controller, the operator station may still be able to obtain the desired runtime data from another controller having similar measurement points in the control system.

Some of the above redundancies become unavailable when a process control system is virtualized because the end user terminal where the data is presented to an operator is separated from the applications executing the business logic that produces the data being presented. That is, in some virtualized control systems, the business logic is executed by VMs implemented on a centralized host system, whereas the end terminals are often thin clients that access the data from the VMs for display using remote display protocols. Thus, whether a VM can retrieve data from an alternate controller or historian if it loses connection with a primary controller or historian is irrelevant to whether the data will be displayed at a thin client if the connection between the thin client and the VM fails. Thus, while there are many redundancies built into the host servers and related hardware that implements the virtualized environment, a point of weakness in the availability and/or reliability of a system is the connection to the end user terminal node (e.g., thin client).

Often, thin clients are not equipped with many redundant features (resulting in many single points of failure) on the assumption that if any of the thin clients associated with a virtual control system are experiencing downtime, the VM associated with the failed thin client can be accessed from another terminal. Some thin clients have been implemented with redundant network cards such that if a network connection is lost, the thin client can switch over to the backup network. While this is an improvement, such solutions still suffer from certain limitations. For example, the delivery of unacknowledged data transmissions will typically be attempted again during retransmissions. However, if there is a network failure any attempt at retransmission will also fail and the process will repeat until the network connection times out. In some such examples, only after the connection times out is the network failure confirmed, at which point an alternate communication path may be established via a backup network. Typically, the time to detect such a network failure and re-establish a connection on a redundant network can take well over a minute. In many process control settings, a minute without communication is unacceptable. An acceptable delay is often less than five seconds. Furthermore, in many such circumstances the end user is unaware that the failure has occurred during most of time between the failure and reconnection and, therefore, may be viewing and relying on information displayed on a screen at the thin client that is out of date. Further still, any data attempted to be delivered after the network failure and before the new connection is established is lost.

One solution that provides seamless failover to a redundant network without losing any data involves the use of the parallel redundancy protocol (PRP). PRP achieves the successful delivery of data communications even when one network fails by transmitting every packet of data twice, once on each network interface of at least two networks. Such an approach has no delay in failure recovery and ensures that no data is lost. However, such an approach involves significant increases in network traffic and computer processing because twice as much data is being transmitted and received.

Other redundancy schemes have been implemented using special hardware such as external switches that can handle redundancy and/or with network interface cards that support link aggregation for use with thin clients. However, there are additional costs in acquiring and maintaining additional hardware devices. Further, there is added complexity in configuring the switches with virtual local area networks (VLANs) and/or link aggregation depending upon the network architecture. Furthermore, such hardware components are often provided by different manufacturers other than the provider of the virtualization software.

The examples disclosed herein provide redundant network systems that overcome the above limitations to provide fast recovery times (less than five seconds) without the loss of data and without significant increases in data processing or bandwidth requirements. The examples disclosed herein may be implemented over any group of network hosts, each having two network interfaces, each of which is connected to one of two networks. As used herein, the term "network host" (or "host") refers to any computer or other device (whether implemented virtually or via physical hardware) that is connected to a network and communicates using the Transmission Control Protocol/Internet Protocol (TCP/IP) protocol stacks. Example network hosts include virtual machines, thin clients, thick clients, embedded controllers, and/or any other suitable computing device.

The examples disclosed herein involve multi-homed network hosts. That is, each host intended to be part of the redundancy schemes described herein is connected to two independent networks via two network interfaces (e.g., NICs). Further, each host participating in the same redundancy scheme is connected to the same two networks as every other host in the scheme. That is, each of the network hosts includes two network interfaces that enable connection-oriented communications over the two separate networks common to all of the hosts included as part of the redundancy scheme. Although the network hosts that form part of a redundancy scheme have two common networks, in some examples, either of the networks may also include one or more other hosts that are not connected to the other network. While such hosts would not be included in the redundancy scheme described herein, such hosts do not prevent such a scheme. Further, one or more of the hosts may be connected to additional networks without affecting the teachings disclosed herein. Further still, in some examples, there may be multiple groups of network hosts within a process control system that each include two common networks. In such examples, each group of networks may separately implement the teachings disclosed herein.

While the redundancy schemes described herein are beneficial to resolve specific concerns of availability in the context of virtual process control systems, the teachings described herein may alternatively be implemented in an entirely physical environment (i.e., without virtualization). That is, the teachings disclosed herein are applicable to any set of network hosts sharing two common networks and communicating based on the TCP/IP protocol.

The example redundancy schemes described herein is accomplished by monitoring the connection status between network hosts over the two independent networks common to the network hosts. By monitoring the network connections in substantially real-time, network failures are detected quickly. Once a network failure is detected in one of the networks, the associated network host, in accordance with the teachings disclosed herein, uses Internet Protocol (IP) routing standards to automatically establish an alternate communication path that bypasses the failed network. More particularly, the network host re-routes transmissions from one of the network interfaces (connected to the failed network) through the other network interface (connected with the operational network).

In some disclosed examples, the detection of a network failure and the establishment of an alternate communication path takes less than five seconds. In some examples, shorter times are possible (e.g., 500 milliseconds or less). Thus, the examples disclosed herein provide recovery times within the requirements needed for process control system environments to ensure reliable and up-to-date data is available to operators and other end users. Furthermore, the time taken to detect a network failure and establish an alternate communication path is less than the connection timeout period for data transmissions. That is, an alternate route will be established before the network host stops attempting retransmission of the data. As such, no data is lost and will be delayed at most a few seconds.

The substantially real-time detection of network failures as described herein to enable fast recovery from such failures is achieved by the continuous monitoring of the connectivity between networks hosts over each of two networks connecting the hosts. In some examples, each network host prepares integrity messages that are frequently transmitted over the networks to each of the other network hosts. In some examples, the integrity messages are distinct from typical data transmission between the hosts associated with the normal operation of the process control system. In some examples, the integrity messages are broadcast over the corresponding network. In other examples, the integrity messages are multicast to only those network hosts configured to receive the messages. In some examples, the transmission of each successive integrity message from each network host alternates between each network interface. In some examples, an integrity message is transmitted from each of the network interfaces of each of the connected hosts before a subsequent integrity message is sent from any of the network interfaces. That is, some examples cycle through each network interface of each network host before returning to the first network host to repeat the process. In some examples, cycling through each of the network interfaces of each network host occurs in a fraction of a second. In this manner, each network host transmits an integrity message to every other network host via each network interface on a frequent basis. As a result, the connections between each network host via each network interface can be constantly monitored to quickly detect a failure between any two network hosts.

Each integrity message serves to test the connectivity of the transmitting host with each of the other hosts over the corresponding network. If each of the other network hosts receives an integrity message from a transmitting host over a particular network, then each of the network hosts can confirm that the communication status between itself and the transmitting host over that network is good. On the other hand, if one or more of the network hosts fails to receive an integrity message transmitted from a particular host, the absence of the integrity message is an indication of a network fault. Thus, the network hosts that fail to receive an expected integrity message may confirm that the connection status between itself and the host from which the message was expected is bad.

In some examples, the integrity messages are transmitted periodically on a known time interval such that if no message is received from a particular network interface of a particular network host over a period longer than the known time interval a network failure may be assumed. In some examples, a network failure is detected based on the absence of an integrity message being received over a threshold period of time that is three times the time interval between each successive integrity message sent from the same network interface of the same network host. In some examples, the threshold period of time may be longer or shorter than three times the interval.

The periodic integrity messages transmitted from each host to every other host over each network serves as a check or test of the connection between each network host via each network. If a network host receives an integrity message, the connection or communication status between that host and the network host that sent the message is confirmed to be good. If a network host does not receive an integrity message (after a threshold period of time), the connection status between that host and the network host from which a message was expected is determined to be bad. Thus, in some examples, the connection or communication status between each host is determined based on whether messages are received independent of the content contained in the messages. However, in some examples, the content of the integrity messages includes integrity information to provide further information for each of the network hosts to verify the connection statuses between the different hosts over the different networks.

In some examples, the integrity messages include host information that identifies the network host from which the integrity message was sent. In some examples, the host information includes the IP addresses of both network interfaces of the network host sending the message. In this manner, every network host has the necessary IP information to create alternate communication paths when a network failure is detected. In some examples, the host information is used by each network host to discover the other hosts on the network.

Additionally, in some examples, the integrity messages include integrity information indicative of the connection or communication status between the network host transmitting the message and each of the other hosts for both network interfaces. In some examples, by generating this information and receiving the communication statuses associated with each of the other network hosts (when they transmit their integrity messages) each of the network hosts can generate an integrity table that represents the communication statuses between itself and every other host. In some examples, such information is relied on to define an alternate communication path when a direct connection has failed due to a network fault. Additionally or alternatively, in some examples, the integrity information included with each integrity message is used as a redundant check on the communication status determined by each host based on whether and when it received integrity messages from the other hosts.

Although the frequent transmission of integrity messages imposes some additional load on the networks, the total amount of network traffic remains substantially less than the network traffic involved in implemented a system using PRP. For example, if a network includes 10 hosts that each receive 1000 packets of data associated with a process control system every second, the total amount of data transmitted to each host when using PRP doubles to 2000 data packets per second. By contrast, if each of the 10 hosts transmits 2 integrity message packets each second in accordance with the teachings disclosed herein, the total amount of data transferred to each host would be 1020 data packets per second (1000 process control data packets plus the 2×10=20 integrity message data packets). Clearly, the 1020 data packets transmitted in the disclosed examples is substantially less than the 2000 data packets required using PRP. The network load produced by the integrity messages is a function of the number of network hosts and the frequency of integrity messages, but is independent of the amount of process control data transmitted over the network. Thus, if each network host in the above example received 5000 packets of process control data per second, the amount of integrity packets would remain at 20 packets per second. However, if the integrity messages are sent more frequently (e.g., 5 messages per second) to enable faster detection of network failures, the load due to the integrity messages would increase proportionately (e.g., up to 5×10=50 data packets per second) but will still result in a total amount well below the load imposed by PRP (e.g., 1050 packets per second as compared with 2000 packets per second). Likewise, if the number of hosts is increased (e.g., up to 50) but the frequency of integrity messages is kept at 2 data packets per second, the total amount of integrity data received each second at each network host is 2×50=100 packets per second (for a total of 1100 data packets per second). Thus, while additional hosts and/or more frequent integrity messages impose additional burden on the networks, the level of burden remains much less than doubling the amount of network traffic as is required when implementing PRP.

Furthermore, the teachings described herein are software based such that there is no need to acquire, configure, rely on, and/or maintain any special or additional hardware (e.g., network switches that can provide redundancy). As such the examples disclosed herein can be used out-of-the-box for any suitable network while reducing the complexity of the configuration and setup.

In some examples, in the context of virtual process control systems, network redundancy software and the associated configuration tool to implement the teachings disclosed herein are included in virtualization software (e.g., DeltaV Virtual Studio™) to be automatically incorporated into virtual machines creating the software. In some examples, after assigning IP addresses to the network interface cards (NICs) on the virtual machine, the configuration tool can be run to set up redundancy across any two networks. Additionally or alternatively, in some examples, the virtualization software may attach a disk to a virtual machine that contains the necessary files and a script that automatically creates the redundancy service, copies the files onto the virtual machine, launches the configuration tool, and ejects the disk. The disk enables the creation of such redundancy schemes on virtual machines created with earlier versions of virtualization software.

In some examples, both the network redundancy software and the configuration tool are included in a remote desktop connection installer (e.g., DeltaV Remote Desktop Connection). In such examples, if the remote desktop connection installer detects that there are already two networks set up, it can automatically configure redundancy for those networks. Otherwise, the configuration tool can be run manually after IP addresses have been assigned to each network host.

The examples disclosed herein may be integrated into a reliability monitoring system that alarms users of scenarios that compromise the availability of a system. For example, if one of the redundant network paths has become unavailable or inoperative (whether active or standby), an alert or alarm may be generated to inform an end user (e.g., an operator or maintenance technician) of the failure and provide an opportunity to address the problem. Additionally, in some examples, the occurrence of network failures may be logged in a data historian. In such examples, the log includes the timing of the failure as well as an identification of the network hosts affected.

Turning in detail to the figures, FIG. 1 is a schematic illustration of an example process control system or distributed control system (DCS) 100 within which the teachings of this disclosure may be implemented. As used herein, the phrase "process control system" is used interchangeably with the phrase "distributed control system." The example DCS 100 of FIG. 1 includes process controllers 102 communicatively coupled to a plurality of smart and/or non-smart field devices 104 using any desired communication media (e.g., wireless, hardwired, etc.) and protocols (e.g., Foundation Fieldbus, Profibus, HART, etc.). The example controllers 102 of FIG. 1 may be, for example, a DeltaV™ controller sold by Fisher-Rosemount Systems, Inc., an Emerson Process Management company. While the teachings disclosed herein are described in connection with DeltaV™ hardware, software, and/or firmware, the teachings may be adapted for other hardware (e.g., other controllers), firmware, and/or software manufactured and/or developed by other entities. Further, while two controllers 102 are shown in FIG. 1, additional and/or fewer controllers and/or process control platforms of any desired type and/or combination of types could be implemented in the example DCS 100.

Typically, controllers in a process control system are communicatively coupled to one or more operator stations, application stations, and/or other workstations (collectively referred to herein as workstations) that may be associated with one or more computers. However, in the illustrated example, the controllers 102 are communicatively coupled to an example virtual process control environment 106. The example virtual process control environment 106 of FIG. 1 includes an example domain controller 108, an example first host server 110, an example second host server 112, an example third host server 114, and an example storage area network (SAN) 116. In the illustrated example, the virtual process control environment 106 implements virtual machines corresponding to a plurality of virtual workstations 117 listed in a table 118.

As represented in the table 118, the virtual workstations 117 implemented for the DCS 100 include eight virtual operator stations 120, four virtual application stations 122, and one virtual primary control system application station 124 (e.g., a DeltaV™ ProPlus workstation). In particular, in the illustrated example, the first host server 110 implements three of the virtual operator stations 120 and two of the virtual application stations 122, the second host server 112 implements three other ones of the virtual operator stations 120 and one of the virtual application stations 122, and the third host server 114 implements the remaining two of the virtual operator stations 120, the final virtual application station 122, and the virtual primary control system application station 124. While an example division of the example virtual workstations 117 is shown in the table 118, the example virtual workstations 117 may be assigned to any one of the host servers 110, 112, 114 in any combination subject to the demands of each of the host servers 110, 112, 114. Additionally or alternatively, in some examples, duplicate copies of one or more of the virtual workstations 117 may be implemented on separate ones of the host servers 110, 112, 114.

In the illustrated example, the host servers 110, 112, 114 and the SAN 116 are communicatively interconnected to form a network commonly referred to as a cluster. The domain controller 108 is in communication with and manages the cluster and controls access to information stored within the cluster. In the illustrated example, the SAN 116 serves as a common or shared storage (e.g., a cluster shared volume) to which each of the host servers 110, 112, 114 may perform read/write operations to the same logical unit of memory (e.g., the same logical unit number). In this manner, data associated with the implementation of the virtual workstations 117 is stored separate from the native hard drive within each host server 110, 112, 114 to provide high availability for the system. For example, if one of the host servers 110, 112, 114 fails, the virtual workstations 117 implemented by that host server may be started on one of the other host servers 110, 112, 114. In some examples, the SAN 116 is not included such that each host server 110, 112, 114 relies on its local hard drive.

In the illustrated example of FIG. 1, each of the host servers 110, 112, 114 (and the associated SAN 116) of the virtual process control environment 106 is communicatively coupled to the controllers 102 via a bus and/or local area network (LAN) 128, which is commonly referred to as an application control network (ACN). The example LAN 128 of FIG. 1 may be implemented using any desired communication medium and protocol. For example, the example LAN 128 may be based on a hardwired and/or a wireless Ethernet communication scheme. However, any other suitable communication medium(s) and/or protocol(s) could be used. Further, although a single LAN 128 is illustrated in FIG. 1, more than one LAN and/or other alternative pieces of communication hardware may be used to provide redundant communication paths between the example components of FIG. 1.

In some examples, the virtual process control environment 106 (e.g., the domain controller 108, the host servers 110, 112, 114, and the SAN 116) is communicatively coupled to thin clients 126 that can remotely access the virtual workstations 117 implemented within the virtual process control environment 106 to enable operators, engineers, and/or other plant personnel to interact with the workstations via a user interface rendered on a display of the thin clients 126 in the same manner as if the virtual workstations 117 were implemented with a physical computer system and/or other processor platform associated with the display.

While FIG. 1 illustrates an example DCS 100 within which the teachings disclosed herein may be advantageously employed, the teachings disclosed herein may, if desired, be advantageously employed in other process plants and/or process control systems of greater or less complexity (e.g., having more than one virtual process control environment 106, having more workstations (physical and/or virtual), across more than one geographic location, etc.) than the illustrated example of FIG. 1. Further, the teachings disclosed herein may be employed in entirely physical process control systems (e.g., systems that do not have a virtual process control environment 106).

Figure 2:
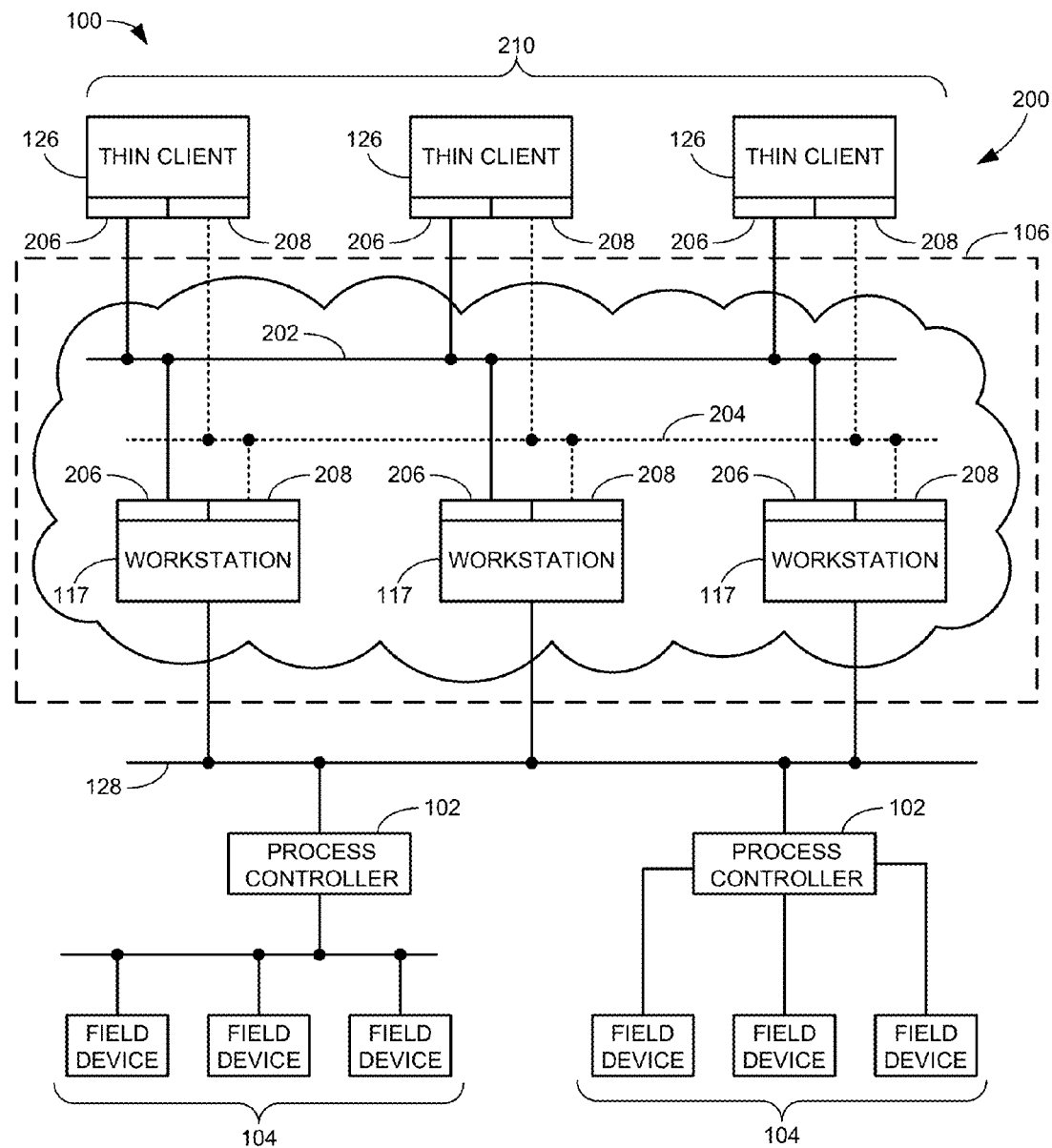
FIG. 2 is a schematic illustration of an example network arrangement of a portion of the example process control system of FIG. 1.

FIG. 2 is a schematic illustration of an example network arrangement 200 of a portion of the example DCS 100 of FIG. 1. In the illustrated example of FIG. 2, three of the thin clients 126 are shown communicatively coupled to three of the workstations 117. In the illustrated example, the workstations 117 are implemented as virtual machines within the virtual process control environment 106, whereas the thin clients 126 are physical computing devices. As shown in FIG. 2, each of the thin clients 126 and each of the workstations 117 is connected to a primary network 202 and a separate secondary network 204. That is, each of the thin clients 126 and the workstations 117 are multi-homed to the same common networks 202, 204. More particularly, in some examples, each of the thin clients 126 and the workstations 117 includes a first network interface 206 (e.g., a network interface controller (NIC)) connected to the primary network 202. Further, in some examples, each of the thin clients 126 and the workstations 117 includes a second network interface 208 connected to the secondary network 202. As used herein, the terms "primary" and "secondary" are used to distinguish between the networks (e.g., the networks 202, 204) that are common between different network hosts and are not intended to suggest that one network is necessarily used first, used by default, used more often, or is more important.

For purposes of explanation, the thin clients 126 and the workstations 117 are generally referred to herein as network hosts 210 in that they are all connected to the same networks 202, 204. In some examples, there may be other types of network hosts 210 in addition to or instead of the thin clients 126 and the workstations 117 shown in FIG. 2 (e.g., thick clients, independent physical workstations, embedded controllers, etc.). The network hosts 210 are distinct from the host servers 110, 112, 114 described above that are used to form the virtual process control environment 106. However, the host servers 110, 112, 114 may implement virtual machines (e.g., the workstations 117) and/or other virtual devices that may be considered network hosts as defined above in accordance with the teachings disclosed herein.

Figure 3:
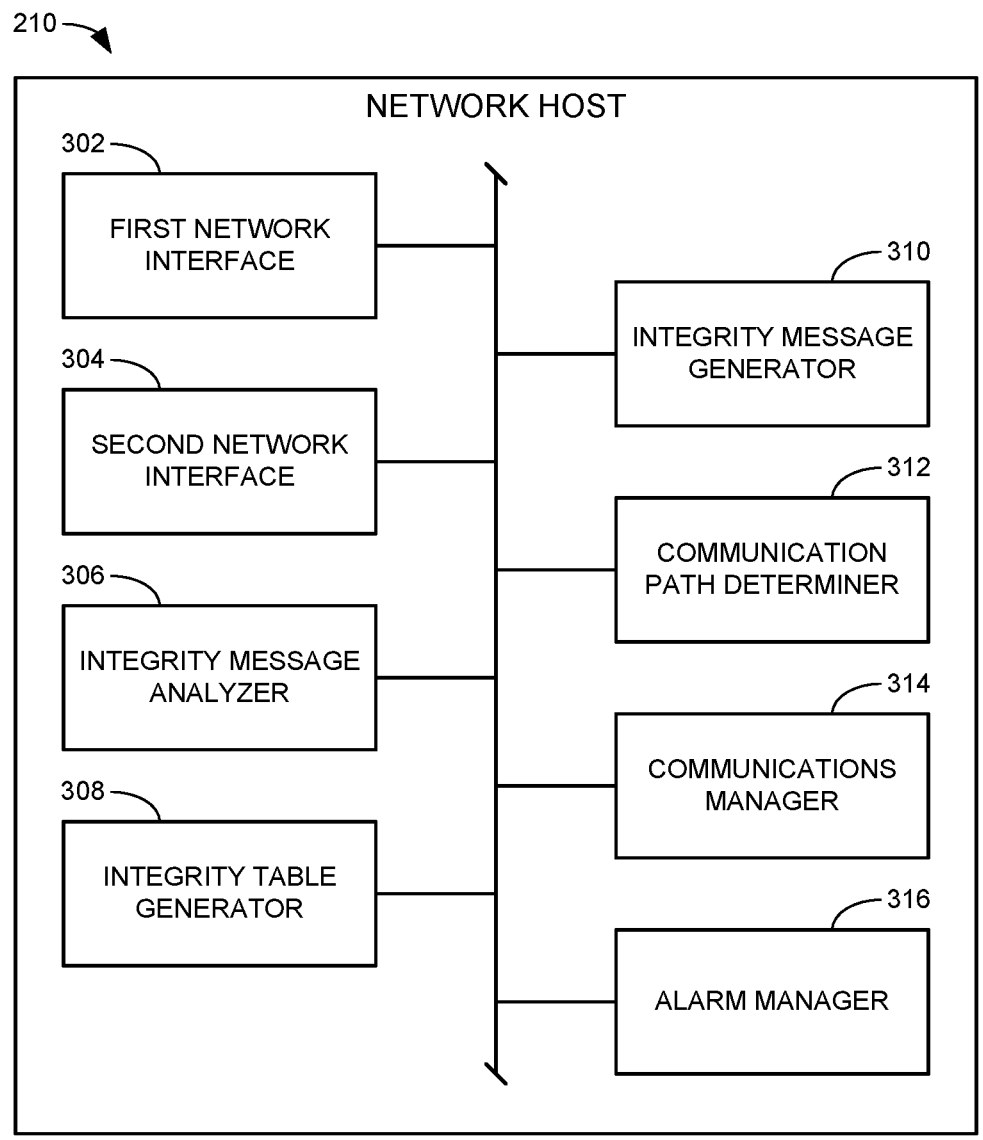
FIG. 3 is a block diagram of an example implementation of any one of the network hosts in the example process control system of FIGS. 1 and/or 2.

FIG. 3 is an example implementation of an example network host 210 constructed in accordance with the teachings disclosed herein. In the illustrated example of FIG. 3, the network host 210 includes an example first network interface 302, an example second network interface 304, an example integrity message analyzer 306, an example integrity table generator 308, an example integrity message generator 310, an example communication path determiner 312, an example communications manager 314, and an example alarm manager 316.

The example network host 210 may be used to implement any one of the thin clients 126 or the workstations 117 of the example DCS 100 of FIGS. 1 and/or 2. However, for purposes of explanation, the network host 210 will be described in connection with a simplified system 400 of network hosts 402, 404, 406 illustrated in FIG. 4. Each of the hosts 402, 404, 406 may be implemented using the example network host 210 of FIG. 3. As shown in the illustrated example of FIG. 4, each of the hosts 402, 404, 406 is a multi-homed network host connected to a primary network 408 and a secondary network 410. Further, as shown in the illustrated example, the primary network 408 and the secondary network 410 are common to each of the three network hosts 402, 404, 406. More particularly, each of the network hosts 402, 404, 406 includes a first network interface 302 through which each network host 402, 404, 406 connects to the primary network 408. Further, in the illustrated example, each of the network hosts 402, 404, 406 include a second network interface 304 through which each network host 402, 404, 406 connects to the secondary network 408. As a result, all of the network hosts 402, 404,

406 can communicate directly with each other via their corresponding first network interfaces 302 over the primary network 408 and/or communicate directly via their corresponding second network interfaces 304 over the secondary network 410. In some examples, there may be one or more switches on either of the networks 408, 410 between the hosts 402, 404, 406. However, for purposes of this disclosure, the network hosts 402, 404, 406 are said to communicate "directly" when corresponding network interfaces 302, 304 communicate over the network to which they are connected, regardless of whether the transmission passes through any switches.

Figures 4, 5:
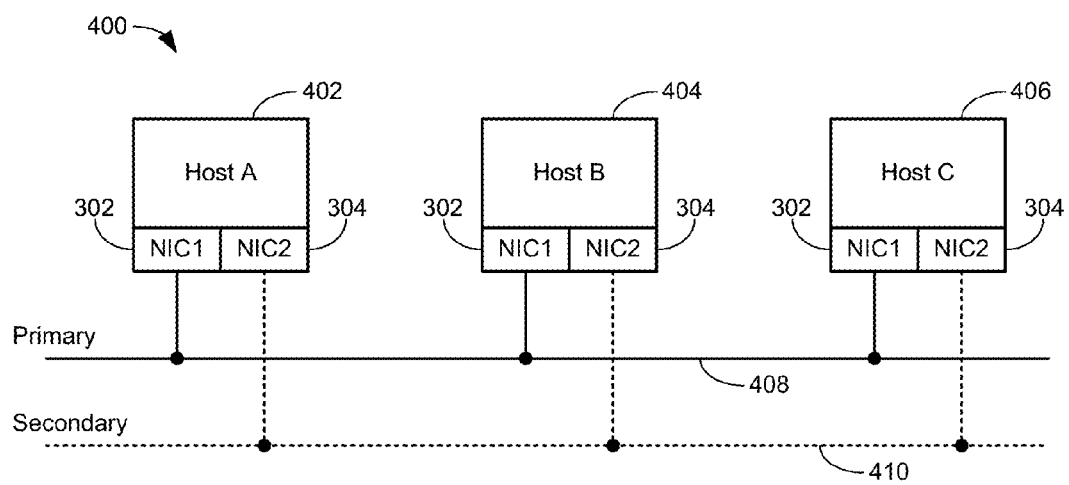
FIG. 4 is a schematic illustration of an example system of network hosts connected via two common networks.
FIG. 5 is a table representing the communication status between the network hosts of FIG. 4.

Returning to FIG. 3, the example network host 210 (corresponding to any one of the network hosts 402, 404, 406 of FIG. 4) is provided with the first network interface 302 to connect to the primary network 408, thereby enabling communication with other network hosts (e.g., the network hosts 402, 404, 406) on the primary network 408. The example network host 210 is provided with the second network interface 304 to connect to the secondary network 410, thereby enabling communication with other network hosts (e.g., the network hosts 402, 404, 406) on the secondary network 410. In some examples, the first and second network interfaces 302, 304 are implemented via physical network interface cards (NICs) (e.g., in the physical thin clients 126 of FIGS. 1 and/or 2). In other examples, the first and second network interfaces 302, 304 are implemented as virtual components of a virtual machine (e.g., in the virtual workstations 117 of FIGS. 1 and/or 2). In some examples, Internet Protocol (IP) routing is enabled between the first and second network interfaces 302, 304, regardless of whether the first and second network interfaces 302, 304 are implemented physically or virtually. In this manner, communications delivered to the first network interface 302 with a final destination intended for the second network interface 304 can be passed on to the second network interface 304. In such examples, the first network interface 302 is defined as a router or gateway with respect to the second network interface 304 to forward any data destined for the second network interface 304. Likewise, in the illustrated example, communications delivered to the second network interface 304 with a final destination intended for the first network interface 302 can be passed on to the first network interface 302 via the second network interface 304.

In the illustrated example of FIG. 3, the network host 210 is provided with the integrity message analyzer 306 to analyze integrity messages received from other network hosts to determine a connection or communication status between the network host 210 and the other network host transmitting the integrity message. As used herein, a communication status refers to an indication of whether direct communications may occur between corresponding network interfaces 302, 304 of two particular network hosts 402, 404, 406 over the corresponding network 408, 410. When direct communication between two corresponding network interfaces of two network hosts is possible, the communication status is "good." When there is a network failure such that data cannot be transmitted directly between the two network interfaces over the corresponding network, the communication status is "bad." The particular nature of the network failure is not relevant to the teachings disclosed herein. Thus, whether a cable is unplugged, broken (e.g., cut), or whether one of the network interfaces 302, 304 has failed internally and/or any other circumstance that prevents communications between corresponding interfaces, a bad communication status is set between the interfaces affected.

As each network host 402, 404, 406 receives the integrity messages periodically transmitted from the first network interfaces 302 (over the primary network 408) of each of the other network hosts, the integrity message analyzer 306 confirms that the communication status over the primary network 408 between the receiving network host and the transmitting network host is good because an integrity message was successfully received. Likewise, as each of the network host 402, 404, 406 receives the integrity messages periodically transmitted from the second network interfaces 304 (over the secondary network 410) of each of the other network hosts, the integrity message analyzer 306 confirms that the communication status over the primary network 408 between the receiving network host and the transmitting network host is good. That is, in some examples, the receipt of the message serves as the basis to confirm that the communication status is good. Thus, in some examples, the particular content of each integrity message is irrelevant to the determination of the connection or communication status. However, in other examples, the content of the integrity message can provide a second level of confirmation of the communication status and/or provide additional detail that is useful in implementing the teachings disclosed herein.

By contrast, if there is a network failure, such as, for example, one of the network interfaces 302, 304 of one of the network hosts 402, 404, 406 failing, any integrity message the network host with the failed interface attempts to transmit via the failed network interface will not be delivered. When an integrity message is not received when expected (e.g., due to a network failure), in some examples, the integrity message analyzer 306 determines that there is a network failure and, thus, that the communication status between corresponding network interfaces is bad. In particular, in some examples, integrity messages are periodically transmitted over each of the primary and secondary networks 408, 410 via the corresponding first and second network interfaces 302, 304. In some examples, each integrity message sent from a particular network interface of a particular network host is transmitted within a particular time interval from the previous integrity message sent from the same network interface of the same network host. As such, if the time interval, beginning after receiving an integrity message (indicating the communication status is good), is exceeded without a new integrity message being received, the integrity message analyzer 306 of the receiving network host may determine that the expected transmission failed. The absence of an expected integrity message, in such examples, indicates a failed or bad communication status with respect to the particular network interface of the transmitting network host. In some situations, factors other than a network failure may play a role in whether a particular integrity message is communicated within the configured time interval for successive messages. Accordingly, in some examples, the integrity message analyzer 306 may determine that a communication status between corresponding network interfaces of two different network hosts is bad only after a threshold period of time greater than the time interval expected between successive messages from the same network interface of the same network host such as, for example, three times the time interval. In other examples, the time interval may correspond to the expected duration of for three integrity messages to be received from a particular network host regardless of the network interface from which the messages were sent. For example, each host may send two integrity messages (one via each network interface) during each time interval cycling through all of the network interfaces of all of the network hosts that fail to be delivered such that the next failed transmission (regardless of the network interface) is sufficient to indicate a bad communication status. In some examples, the integrity message analyzer 306 analyzes the content of the integrity messages received from other network hosts 402, 404, 406 to determine and/or update its own integrity information as described more fully below.

In the illustrated example of FIG. 3, the network host 210 is provided with the integrity table generator 308 to generate an integrity table or other data structure storing integrity information indicative of the connection or communication status between each network host (e.g., the network hosts 402, 404, 406) over each of the primary and secondary networks 408, 410 (e.g., via each of the first and second network interfaces 302, 304).

In the illustrated examples, a separate communication status is associated with each network interface 302, 304 of each network host with respect to every other network interface 302, 304 connected to the same network. Thus, in the illustrated example of FIG. 4, the first network interface 302 of the first network host 402 (Host A) has a separate communication status for each of the first network interfaces 302 of the second network host 404 (Host B) and the third network host 406 (Host C) because each of the network interfaces 302 of the network hosts 402, 404, 406 are connected to the same primary network 408. However, in the illustrated example, there is no communication status defined between the first network interface 302 of the first network host 402 and either of the second network interfaces 304 of the second and third network hosts 404, 406 because the first network interface 302 of the first network host 402 and the second network interfaces 304 of the other network hosts 404, 406 are connected to different networks and, therefore, never communicate directly.

In some examples, the integrity table is populated based on the communication statuses as determined by the integrity message analyzer 306 described above. That is, when the integrity message analyzer 306 receives an integrity message from a particular host, the integrity table generator 308 sets the communication status with the particular host (over the network on which the message was received) to good. When the integrity message analyzer 306 determines that an integrity message was not received as expected from a particular host (e.g., a threshold period of time has elapsed without receiving a message), the integrity table generator 308 sets the communication status with the particular host (over the network on which the message should have been received) to bad. Relying solely on whether integrity messages are received in this manner, the integrity message analyzer 306 cannot directly determine the communication status between two different network hosts other than itself. Accordingly, in some examples, the integrity table created by the integrity table generator 308 includes only the communication status information associated with the corresponding network host 210. In other examples, the integrity message analyzer 306 analyzes the content of the integrity messages received from other network hosts to determine the communication status between the other hosts.

An example table 500 representing integrity information for the system 400 of FIG. 4 is shown in FIG. 5. In some examples, the integrity table generator 308 includes at least some of the information contained in the table 500 of FIG. 5, though not necessarily all of it and not necessarily organized in the same manner. In the table 500 of FIG. 5, each of the network interfaces 302, 304 (based on the associated primary or secondary network 408, 410) of each of the network hosts 402, 404, 406 of FIG. 4 is identified along the top row and down the left-hand column of the table 500. The status of the direct communication link between any two of the network hosts 402, 404, 406 via either of the corresponding network interfaces 302, 304 is indicated in the box corresponding to the row and column of the connecting hosts 402, 404, 406 over the corresponding network 408, 410.

As shown in the illustrated example, the table 500 is divided into four quadrants 502, 504, 506, 508. The first quadrant 502 represents the communication statuses between the network hosts 402, 404, 406 over the primary network 408 (e.g., via the first network interfaces 302). The fourth quadrant 508 represents the communication statuses between the network hosts 402, 404, 406 over the secondary network 410 (e.g., via the second network interfaces 304). As shown, the boxes along the diagonal of the table 500 passing through the first and fourth quadrants 502, 508 correspond to the row and column associated with the same network interface of the same network host. As such, these boxes are shaded out because they do not define a communication link between different points.

The second and third quadrants 504, 506 of the example table 500 do not represent communication statuses as described herein because the corresponding rows and columns are not associated with the same networks 408, 410 and, therefore, do not represent direct communication links. As such, most of the boxes in the second and third quadrants 504, 506 are crossed-out. However, the boxes in each of the second and third quadrants 504, 506 associated with the first and second network interfaces 302, 304 of the same network host 402, 404, 406 are represented with the label "Local" to indicate that local communication between the network interfaces 302, 304 within the host network 402, 404, 406 is possible when IP routing is enabled in the hosts as described above. However, inasmuch as local communications between two network interfaces of the same network host is not over either of the networks 408, 410, such communications are irrelevant in defining the communication statuses for the network in accordance with the teachings disclosed herein. That is, the local communications represented in the example table 500 are shown for purposes of explanation only. Thus, in some examples, the integrity table created by the integrity table generator 308 may exclude the information represented in the second and third quadrants 504, 506. Further, in some examples, the integrity table generator 308 may include only the information associated with the network host 402, 404, 406 to which the integrity table generator 308 belongs. For example, the integrity table for Host A may only include the information in the rows and/or columns associated with Host A.

Figures 6, 7:
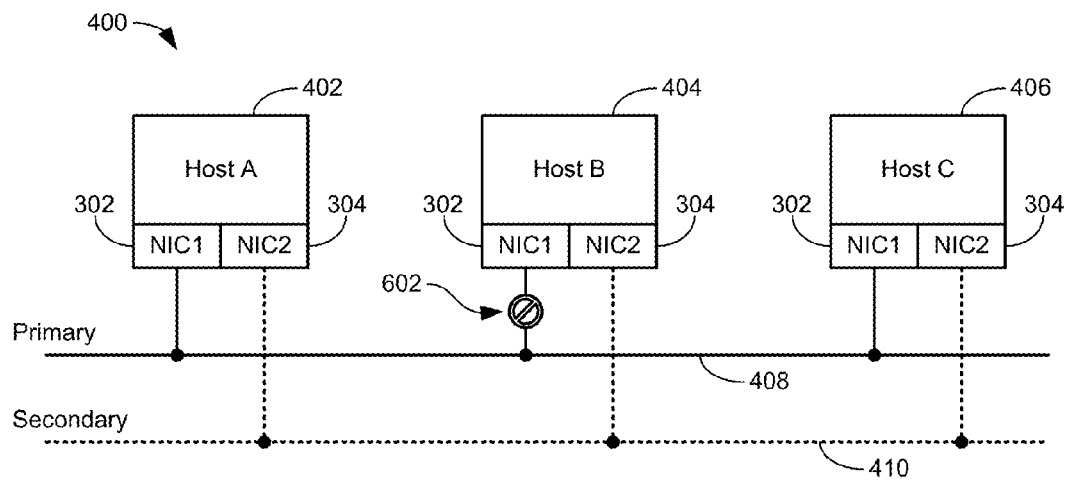
FIG. 6 is a schematic illustration of the example system of FIG. 4 with a network failure associated with one of the network hosts.
FIG. 7 is a table representing the communication status between the network hosts of FIG. 6.

As shown in the illustrated example of FIG. 5, the communication status between each of the network interfaces 302, 304 of each of the network hosts 402, 404, 406 is "Good" indicating that there are no network failures. By comparison, the example system 400 of FIG. 4 is reproduced in FIG. 6 but with a network failure 602 associated with the first network interface 302 of the second network host 404 (Host B) and the corresponding table 700 of communication statuses is shown in FIG. 7. As shown in the illustrated example of FIG. 7, the fourth quadrant 508 is identical to the fourth quadrant in the example table 500 of FIG. 5 in that the communication status of each network connection is good. The fourth quadrant 508 is unchanged between the table 500 shown in FIG. 5 and the table 700 shown in FIG. 7 because the fourth quadrant 508 is representative of the communication statuses associated with the secondary network 410 and the network failure 602 shown in FIG. 6 only affects the primary network 408. In the illustrated example, the first quadrant 502 (associated with the primary network 408) of the example table 700 of FIG. 7 indicates a bad communication status between the second network host 404 and both of the first and third network hosts 402, 406. However, the communication status between the first and third network hosts 402, 406 over the primary network 408 remains good.

Due to the topology of the example system 400 of FIGS. 4 and 6, whenever a network failure occurs, the failure results in one of the network hosts 402, 404, 406 losing connection with the all other network hosts (e.g., the other two) but the other network hosts will still be able to communicate. In other examples that include more network hosts and/or more complicated network topologies (e.g., with one or more switches) may result in different divisions of communication status between the various network hosts involved. For example, a network failure may result in one network host losing connection with only some of the other network hosts over a particular network while retaining communications with other network hosts over the same network. Similarly, in some examples, a network failure may cause a first group of network hosts to lose connection with a second group of network hosts but the network hosts maintaining connections with other network hosts in the corresponding group.

Returning to FIG. 3, the example network host 210 is provided with the integrity message generator 310 to generate the integrity messages to be transmitted periodically to other network hosts on each of the networks associated with the first and second network interface 302, 304. In some examples, an integrity message includes host information that serves to identify the source or origin of the integrity message (e.g., the network host from which the integrity message was transmitted). More particularly, in some examples, the host information includes an indication of the IP addresses assigned to each of the first and second network interfaces 302, 304 of the network host transmitting the integrity message.

Additionally, in some examples, an integrity message includes integrity information that serves to indicate the connection or communication status between the transmitting network host (e.g., the source of the integrity message) and each of the other network hosts on each of the primary and secondary networks 408, 410. In some examples, the integrity information included in the integrity message corresponds to the information contained in the integrity table generated by the integrity table generator 308. In some examples, the integrity information sent in each integrity message prepared by the integrity message generator 310 of a particular network host includes only the communication status information associated with that particular network host. In some such examples, the integrity message transmitted includes the communication status information associated with the network host for both the primary network 408 and the secondary network 410 even though the particular integrity message is only transmitted over one of the networks at any one time.

In some examples, the integrity message analyzer 306 analyzes the integrity messages to automatically discover other network hosts on each of the primary and secondary networks 408, 410 based on the initial integrity messages received from each of the other network hosts. As described above, each integrity message includes host information identifying the network host transmitting the integrity message. Accordingly, in some examples, if an integrity message is received that identifies a new network host (i.e., a network host from which no prior integrity message has been received), the integrity message analyzer 306 of the receiving network host creates a new entry in the IP routing table for the host based on the received host information (IP addresses for the associated network interfaces 302, 304 of the network host that transmitted the message). Additionally, in some examples, the integrity message analyzer 306 provides the host information to the integrity table generator 308 to update and/or expand the integrity table to store the status of communications between the newly discovered network host transmitting the integrity message and the network host receiving the integrity message. The discovery of new network hosts and the resulting changes to subsequent integrity messages are demonstrated in FIG. 8 described below.

FIG. 8 is a table 800 illustrating example time-lapsed changes to integrity messages transmitted by each of the network hosts 402, 404, 406 of FIG. 4 during an initial discovery of the network hosts 402, 404, 406 and surrounding the occurrence of the network failure 602 of FIG. 6. In the illustrated example of FIG. 8, each row of the table 800 corresponds to a different point in time with lower rows corresponding to later points in time as indicated in the first column 802. Thus, time T1 (on the first row) is at a first point in time, which is followed by time T2 (on the second row), which is followed by time T3 (on the third row), and so forth. In the illustrated example, at each discrete point in time (e.g., T1, T2, T3, etc.) one of the host networks 402, 404, 406 transmits an integrity message over one of either of the primary network 408 or the secondary network 410 via the corresponding network interface 302, 304 of the transmitting host network 402, 404, 406. In the example table 800 of FIG. 8, the network host 402, 404, 406 transmitting the integrity message at any particular point in time is identified in the second column 804 while the network 408, 410 over which the integrity message is transmitted is indicated in the third column 806. In the illustrated example, the network interface 302, 304 connected to the network 408, 410 listed in the table 800 is the interface from which each corresponding integrity message is sent.

As shown in the illustrated example, the source or origin of the integrity messages transmitted at successive points in time cycle through each of the network interfaces 302, 304 of each network host 402, 404, 406 over each network 408, 410 before the same network interface 302, 304 is used to transmit a subsequent integrity message. For example, at time T1, the first network host 402 (Host A) transmits a first integrity message over the primary network 408 (via the first network interface 302). It is not until time T7 that the same network interface 302 of the same network host 402 again transmits an integrity message because integrity messages from both network interfaces 302, 304 of the second and third network hosts 404, 406 and the second network interface 304 of the first network host 402 are transmitted at times T2-T6. In some examples, the time interval between each point in time represented in the example table 800 is approximately the same. As such, the approximate schedule or timing of each successive integrity message is known such that the time interval between each successive integrity message from the same network interface of the same network host is likewise known. Put another way, in some examples, the time interval for the system 400 to cycle through each of the network interfaces of each of the network nodes to transmit an integrity message is known. As a result, the time period since a last integrity message was received from a particular network interface of a particular network host can be monitored to determine when a next integrity message from the same source is expected. In some examples, if no integrity message is received within the expected time period, a network failure is detected. The time period to cycle through every network interface of every network host may differ from system to system depending upon the nature and size of the networks involved and the frequency at which the integrity messages are transmitted. In some examples, the time period of one cycle may be 100 milliseconds. As a result, network failures can be detected and then responded to quickly (e.g., in substantially real time) before important data is lost. For example, a cycle period of 500 milliseconds will result in a switchover time of less than 2 seconds.

The example table 800 of FIG. 8 also indicates the content of each integrity message sent at each point in time. In particular, the fourth column 808 indicates the identifying information sent with each integrity message. As described above, each integrity message includes host information that identifies the network host sending the message including an indication of the IP addresses of each of the network interfaces 302, 304 of the network host. Thus, while an integrity message is sent from the first network host 402 over the primary network 408 in the illustrated example at times T1 and T7, the same host information is also sent to the other network hosts 404, 406 at time T4 via the secondary network 410.

In the fifth column 810 of the example table 800, the integrity information included in each integrity message is represented. As described above, in some examples, the network hosts 402, 404, 406 may discover each other based on the integrity messages received from each other. In such examples, before the network hosts are discovered the integrity messages cannot include any integrity information (e.g., communication statuses between the hosts) because such information is unknown. Accordingly, as shown in FIG. 8, at time T1 the Host A transmits an integrity message that includes the host information for Host A but does not include any integrity information. Because Host B received the integrity message transmitted at time T1 from Host A, the integrity message analyzer 306 of Host B is enabled to identify Host A (based on the transmitted host information) and, thus, create a new entry for Host A (and the corresponding network interfaces 302, 304) in an IP routing table. Additionally, because Host B received the integrity message transmitted from Host A over the primary network 408, the integrity message analyzer 306 of Host B confirms that communications are possible via the primary network 408 to enable the integrity table generator 308 of Host B to set the communication status to good. Accordingly, at time T2, the integrity message transmitted from Host B includes integrity information indicating the existence of Host A (as discovered by Host B) and that the communication status between them over the primary network 408 is good (indicated by the letter "G").

At time T3, the integrity message transmitted from Host C includes integrity information with respect to both Host A and Host B based on the previously transmitted integrity messages sent from each host at time T1 and time T2, respectively. Once the integrity message is sent at time T3 from Host C, the host information from each network host has been transmitted once such that each host is now discovered with respect to the other hosts to enable directed data communications as appropriate (e.g., by using the IP information provided from each of the other network hosts).

As shown in the illustrated example of FIG. 8, each of the first three integrity messages (at times T1, T2, and T3) is transmitted over the primary network 408. As such, the communication statuses indicated between each of the network hosts 402, 404, 406 (Host A, Host B, Host C) as provided in each integrity message is only provided with respect to the primary network 408. It is not until the first integrity message sent over the secondary network 410 (at time T4) from Host A, that the integrity message analyzer 306 of Host B confirms communications are possible between Hosts A and B over the secondary network 410. The confirmation of such a connection is reflected in the subsequent integrity information sent from Host B at time T5. Host C also receives the integrity message sent from Host A at time T4 to confirm communications therebetween via the secondary network 410 as well. Once the integrity message is sent at time T6 from Host C, every network interface 302, 304 of each network host 402, 404, 406 has transmitted an integrity message such that each network host 402, 404, 406 can confirm its connection status with respect to every other host in the system 400. Subsequent integrity messages sent from each host (beginning at time T7) enable the network hosts 402, 404, 406 to continually check the communication statuses between each other and provide an update on any changes to the integrity information.

If each of the network interfaces 302, 304 of each network host 402, 404, 406 maintains a working connection, the integrity information transmitted as part of each subsequent integrity message remains the same with all communication statuses being good as shown at times T7, T8, and T9. However, if a network failure occurs, the subsequent integrity messages of the affected network hosts will eventually be updated to reflect the change in communication status between the affected network hosts.

In the illustrated example of FIG. 8, the network failure 602 of FIG. 6 occurs between times T8 and T9 (e.g., at time T8.5). As shown in the illustrated example, although communications are no longer possible to or from Host B (the second network host 404) because of the failure 602, the communication statuses of all connections indicated by the integrity information sent at times T9 and T10 (from Host C and Host A, respectively) are nevertheless shown as being good. As described above, in some examples, the detection of a bad connection (e.g., a network failure) with respect to a particular network interface is based on a threshold period of time elapsing after the last (e.g., most recent) transmission was received from the particular network interface without receiving a new transmission. In the illustrated example, the last integrity message successfully transmitted from Host B over the primary network 408 (before the network failure 602) occurred at time T8. As there are six different network interfaces to cycle through, the next integrity message transmitted from Host B over the primary network 408 is not expected until time T14. As such, the integrity messages sent at times T9 and T10 continue to represent all communication statuses being good based on the message received at time T8. In some examples, the time between time T8 and time T14 is less than a second, such that this error in the communication status will quickly be resolved.

In the illustrated example, the integrity information sent at time T11 indicates that the communication status between Host B (the network host sending the integrity message) and Host C over the primary network 408 is bad (indicated by the letter "B") while the communication status between Host B and Host A is still good. The different communication statuses indicated with respect to Hosts A and C is a result of the timing of the network failure 602 relative to the timing of the last integrity message received at Host B from each of Hosts A and B via the primary network 408. As shown in the example table 800, the last integrity message transmitted from Host A over the primary network 408 was at time T7, which before the network failure 602 at time T8.5. The next integrity message expected from Host A over the primary network is not expected until time T13. As such, at time T11, the time interval to the next expected integrity message from Host A has not elapsed such that the integrity message analyzer 306 of Host B will not yet confirm the network between the hosts has failed. By contrast, Host C transmitted an integrity message at time T9, which occurred after the network failure 602 at time T8.5. As a result, the integrity message sent from Host C at time T9 would not be delivered to Host B as expected such that the integrity message analyzer 306 determines the connection between the hosts is bad.

As described above, in some examples, the integrity message analyzer 306 analyzes the content of each integrity message (e.g., the integrity information) to update the communication statuses between the network hosts to be presented in a subsequent integrity message. This is illustrated by the integrity message sent by Host C at time T12. As described above, the integrity message sent by Host B at time T8 was successfully received at Host C because the network failure 602 had not occurred yet. Further, the next integrity message from Host B via the primary network 408 is not expected until time T14. However, in some examples, the integrity message analyzer 306 of Host C identifies the bad communication status indicated by the integrity information sent from Host B over the secondary network 410 (at time T11). In some such examples, the integrity message analyzer 306 determines that the communication status between itself and Host B over the primary network 408 is bad.

The integrity information provided by Host A at time T13 still indicates the communication status between Hosts A and B is good because the next expected integrity message from Host B is still in the future (at time T14) and no other integrity message otherwise indicates the bad connection between Hosts A and B. However, while Host A transmits the integrity message at time T13, Host B will not receive the message because of the network failure 602. Thus, the integrity message analyzer 306 of Host B determines that the communication status is bad at time T13 because that is the time the next integrity message from Host A would was expected but never received.

At time T14, the Host B may attempt to transmit an integrity message that indicates the communication failure between Hosts A and B (determined at time T13) and between Hosts B and C (determined at time T9). However, due to the network failure 602, the delivery of the integrity message from Host B will fail such that nothing is delivered to Hosts A and C. In some such examples, as Host B attempts to transmit the integrity message (e.g., at time T14), the transmission may go unacknowledged, thereby indicating to Host B that a network failure has occurred independent of whether the threshold period of time has been exceeded since a transmission is received from the other hosts. With respect to Hosts A and C, a new message was expected at time T14, the period of time between time T8 when the last successfully transmitted integrity message from Host B over the primary network 408 and time T15 exceeds the threshold period of time during which another integrity message is expected. In some such examples, the integrity message analyzer 306 of Host C determines that there is a network failure between Host B and Host C via the primary network 408 and updates the integrity information accordingly (sent at time T15). In other examples, the integrity message analyzer 306 of Host C may have already determined the failed communication status based on the integrity information received from Host B (at time T11) as described above. Accordingly, in such examples, the integrity information included in the integrity message transmitted by Host C (at time T15) continues to reflect the bad communication status. Likewise, in the illustrated example, the integrity message analyzer 306 of Host A determines that there is a network failure between Host A and Host B via the primary network 408 because an integrity message was expected from Host B at time T14. As such, at time T16, the integrity information provided by Host A is updated to reflect the bad communication status. Thus, by time T16, all of the networks hosts have detected the network failure 602 and transmitted an integrity message reflecting the change in communication status. The integrity information in each subsequent integrity message from each host will continue to be the same until another change is detected (e.g., the network failure 602 is repaired and/or another network failure between at least two of the network hosts occurs). Although the illustrated example shows the communication status being updated after only a single interval of time (e.g., one cycle through all the network interfaces), in some examples, the threshold period of time may be longer such as, for example, the duration of two or three full cycles through the network interfaces.

Although the example table 800 shows Host A transmitting an integrity message at times T13 and T19 via the primary network and shows Host C transmitting an integrity message at times T9 and T15 via the primary network, because of the network failure 602 with respect to Host B, the messages from Hosts A and C are only successfully delivered to each other. That is, while Hosts A and C would have received the integrity message transmitted by the other, Host B would not have received either of the integrity messages.

In some examples, as shown in the example table 800 of FIG. 8, the integrity messages sent from each network host 402, 404, 406 alternate between the primary network 408 and the secondary network 410. That is, each of Hosts A, B, and C transmit an integrity message over the primary network 408 followed by each of Hosts A, B, and C transmitting an integrity message over the secondary network 410. Other arrangements are possible. For example, FIG. 9 is a table 900 illustrating different example time-lapsed changes to integrity messages transmitted by each of the network hosts of FIG. 4 during an initial discovery of the network hosts. In the illustrated example of FIG. 9, each network host 402, 404, 406 transmits an integrity message over each network 408, 410 before another network host does the same thing. That is, Host A transmits a first integrity message over the primary network 408 (at time T1) followed by a second integrity message over the secondary network 410 (at time T2) before Host B transmits any integrity messages (beginning at time T3). The resulting integrity information in successive integrity messages as each of the network hosts are discovered is shown in the example table 900 of FIG. 9.

As described above, in some examples, each network host may determine the communication status between itself and the other network hosts based on whether or not integrity messages from the other hosts are received when expected. As such, in some examples, the only thing that is included in each integrity message is the host information. In such examples, the integrity information shown in the fifth column 810 corresponds to the information stored in the integrity table created by the integrity table generator 308. However, this information may not be shared with the other network hosts. That is, in some examples, each host generates its own integrity table without sharing the resulting integrity information. In other examples, the integrity information is shared between hosts to enable comparison of communication statuses determined between each of the network hosts. In some examples, the integrity information received by a network host from other network hosts is used to update or complete an integrity table (e.g., if the integrity table is to include the communications statuses of all network connections). Further, in some examples, the integrity information received by a network host from another host is used to update the integrity information included in the next integrity message the network host is to send out.

Returning to FIG. 3, the example network host 210 is provided with the example communication path determiner 312 to determine and set the path for data communications between the network host 210 and other network hosts. In some examples, when the communication status between a particular network interface (e.g., the first network interface 302) and a corresponding interface of another network host over the associated network (e.g., the primary network 408) is good, the communication path determiner 312 defines the communication path as passing over the network associated with the connected network interfaces. As such, the network host communicates directly via the corresponding network. However, when the integrity message analyzer 306 detects a network failure between the network interfaces (e.g., a bad communication status), the communication path determiner 312 may identify an alternate path between the network interfaces. For example, when there is a network failure between two network hosts via the primary network 408, the communication path determiner 312 may define the alternate communication path to pass through the secondary network 410 connecting the two network hosts. Example communication paths are described more fully below in connection with FIGS. 10-12.

In some examples, the communication path determiner 312 establishes an alternate communication path as soon as a bad communication status is detected. In other examples, the communication path determiner 312 establishes an alternate communication path after a threshold number times that a communication path is confirmed to be bad. In some examples, the communication path determiner 312 of a particular network host establishes an alternate communication path with respect to another host after a threshold number of successive integrity messages sent from the particular host network indicate the communication status between the hosts is bad. For example, the threshold number of integrity messages with a bad communication status may be three. As shown in the illustrated example of FIG. 8, the first integrity message sent from Host B indicating a bad communication status with respect to Host C is sent at time T11 over the secondary network 410. The second integrity message with the same information (a bad communication status between Hosts B and C) is sent at time T14 via the primary network 408 that never reaches other hosts because of the network failure 602 (which is why the table 800 indicates nothing is delivered). The third integrity message sent from Host B indicating a bad communication status with respect to Host C is sent at time T17 over the secondary network 410. Thus, in such examples, the communication path determiner 312 of Host B establishes an alternate communication path between Host B and Host C at time T17.

By contrast, in the above example, the communication path determiner 312 of Host B establishes an alternate communication path between Host B and Host A at time T20 because this is the third integrity message sent from Host B (though never delivered) indicating a bad communication status between Hosts B and Hosts A. The first integrity message sent (attempted via the primary network 408) from Host B with such information is at time T14 and the second integrity message sent (and successfully delivered via the secondary network 410) is at time T17. With respect to Host A, the three successive integrity messages indicating the failed connection with Host B are at times T16, T19, and T22 (not shown). Thus, the communication path determiner 312 of Host A establishes an alternate communication path between Host A and Host B at time T20. With respect to Host C, the three successive integrity messages indicating the failed connection with Host B are at times T12, T15, and T18. Thus, the communication path determiner 312 of Host C establishes an alternate communication path between Host C and Host B at time T18.

Figure 10:
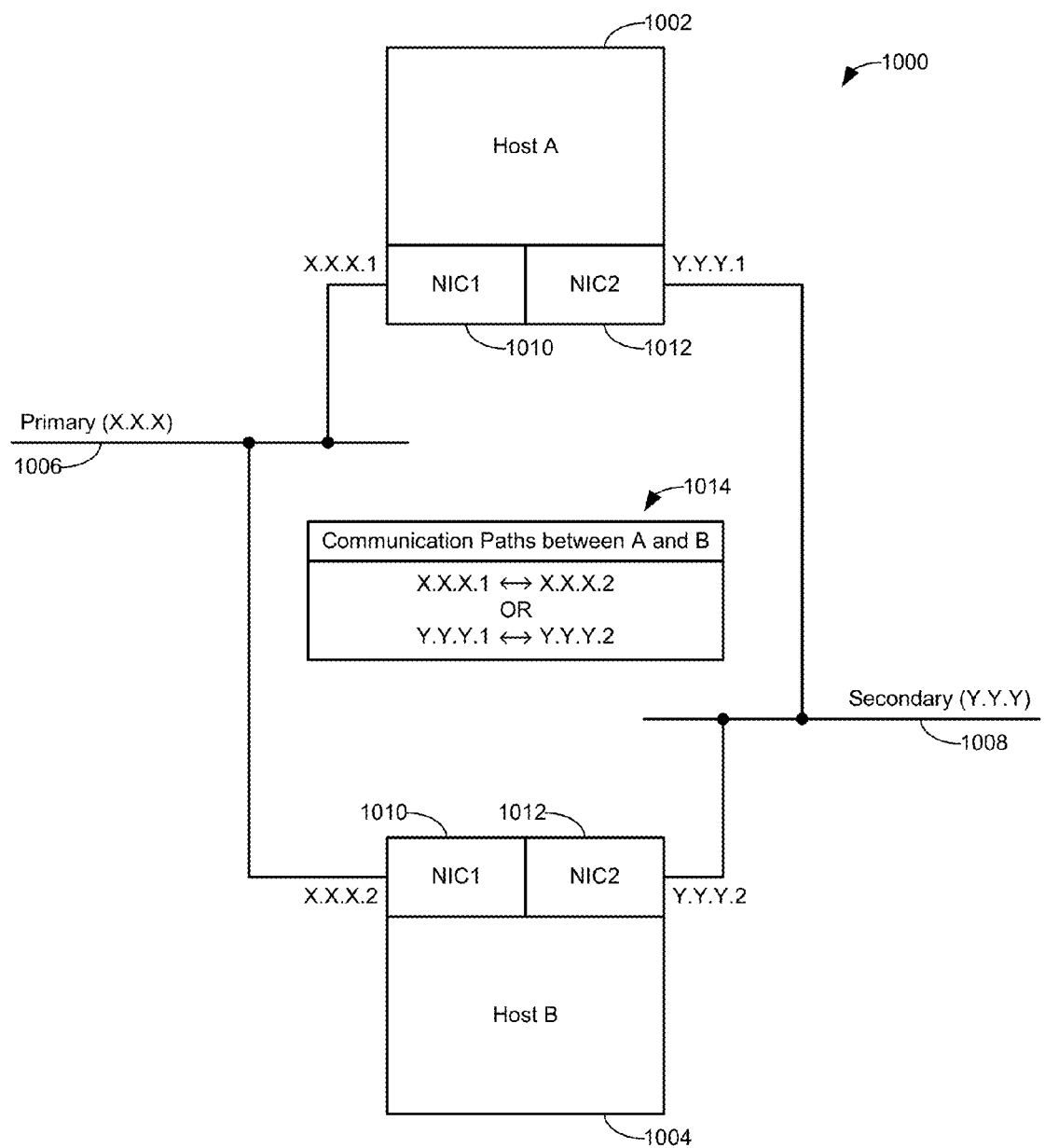
FIG. 10 is a schematic illustration of an example system of two example network hosts connected via two common networks.

FIG. 10 is a schematic illustration of an example system 1000 with two example network hosts 1002, 1004 connected via a primary network 1006 and a secondary network 1008. In some examples, the network hosts 1002, 1004 function similarly to the network host 210 described above (corresponding to the thin clients 126 and/or the workstations 117 of FIGS. 1 and/or 2, and/or the network hosts 402, 404, 406 of FIGS. 4 and/or 6). Thus, as shown in the illustrated example, each of the network hosts 1002, 1004 has a first network interface 1010 connected to the primary network 1006 and a second network interface 1012 connected to the secondary interface 1008. The primary and secondary networks 1006, 1008 of FIG. 10 may correspond to the primary and secondary networks 408, 410 of FIG. 4.

In the illustrated example of FIG. 10, the primary network 1006 is identified with an IP network number represented as X.X.X. The first network interfaces 1010 of the first network host 1002 and second network host 1004 are connected to the primary network 1006 with assigned IP addresses of X.X.X.1 and X.X.X.2, respectively. The secondary network 1008, of the illustrated example, is identified with an IP network number represented as Y.Y.Y and the second network interfaces 1012 of the first network host 1002 and second network host 1004 are connected to the secondary network 1006 with assigned IP addresses of Y.Y.Y.1 and Y.Y.Y.2, respectively.

As shown in the illustrated example, there are two direct communications paths from the first network host 1002 to the second network host 1004. Both communication paths are direct from either the first network interface 1010 of the first network host 1002 to the first network interface 1010 of the second network host 1002 over the primary network 1006 or from the second network interface 1012 of the first network host 1002 to the second network interface 1012 of the second network host 1004 over the secondary network 1006. Likewise, there are two direct paths going from the second network host 1004 to the first network host 1002 that are the reverse of the paths outlines above. These direct communication paths are summarized in the table 1014 of FIG. 10.

Figure 11:
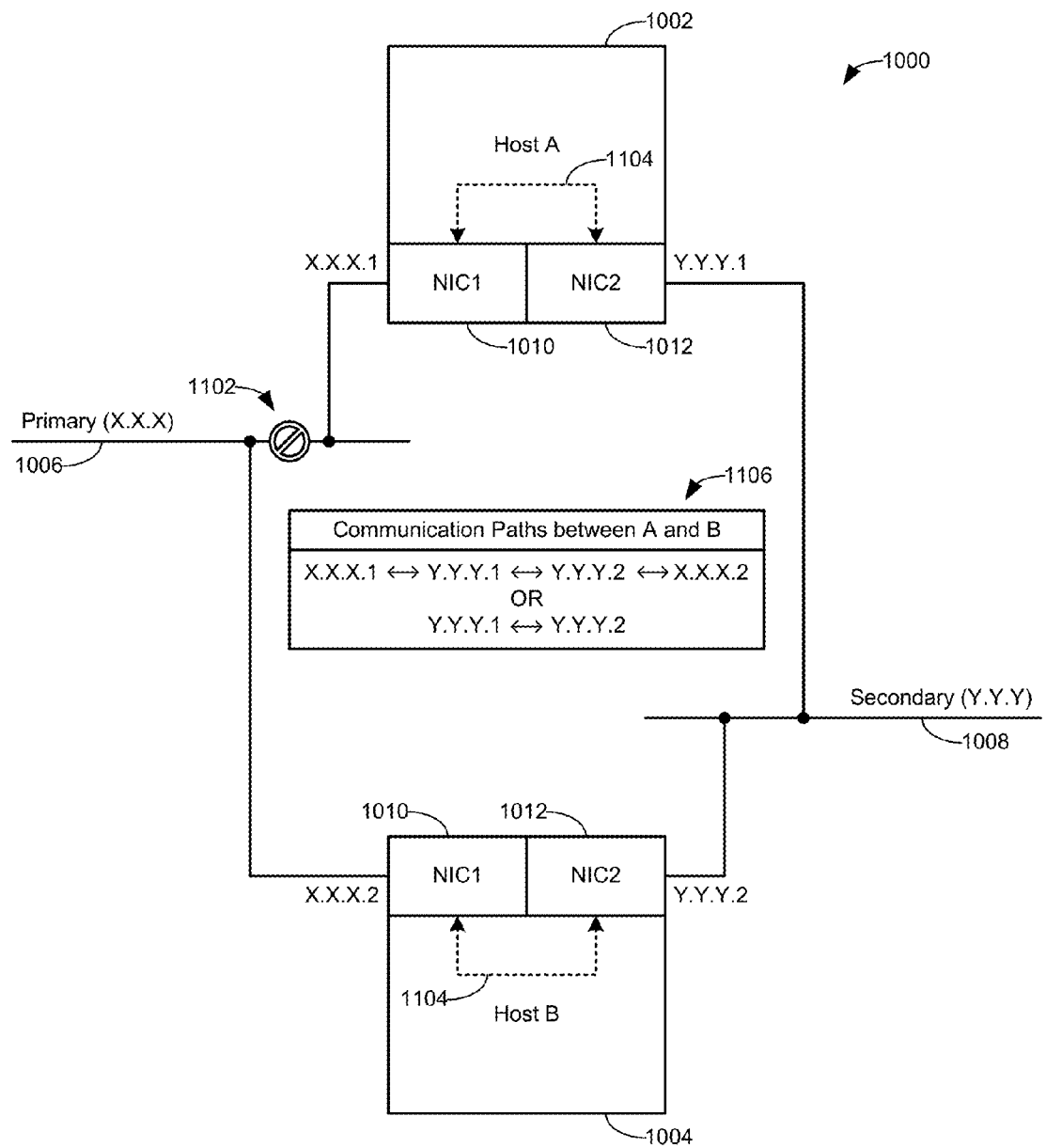
FIGS. 11 and 12 are schematic illustrations of the example system of FIG. 10 with a network failure in each of the two networks, respectively.

If there is a network failure on one of the networks 1006, 1008, direct communications between the network interfaces 1010, 1012 connected to the failed network are no longer available. However, a failure in one network will not affect the other network such that direct communications are still available over the other (properly functioning) network. In some such examples, communications between the network interfaces associated with the failed network are achieved indirectly through the good network. For example, FIG. 11 illustrates the example system 1000 with a network failure 1102 in the primary network 1006. While the second network interfaces 1012 of the first and second network hosts 1002, 1004 can communicate directly over the secondary network 1008, the first network interfaces 1010 of the first and second network hosts 1002, 1004 cannot communicate directly over the primary network 1006 because of the network failure 1102.

In some examples, the above network failure 1102 is bypassed using internal or local routing 1104 within each of the network hosts 1002, 1004 between the network interfaces 1010, 1012 of each network host 1002, 1004 by enabling IP routing. With IP routing enabled within a network host, in some examples, when a bad communication status is detected with respect to one of the network interfaces and a corresponding network interface of another network host, the communication path determiner 312 defines a new or alternate path that relies on the good network to which the network host is connected. In particular, in some examples, the communication path determiner 312 automatically updates the IP routing table for the network interface connected to the failed network with an entry that defines the other network interface of the same network host as a gateway or router between the network interface with a bad connection and the network that has a good connection. As both the network host transmitting data and the network host receiving the data detects the network failure, the network interface on each host connected to the good network will both be defined as gateways for the other network interface of the corresponding network host to allow data communications to be forwarded to the final destination as appropriate.

For example, the first network interface 1010 of the first network host 1002 may attempt to transmit data (e.g., data associated with the operation of the process control system) to the first network interface 1010 of the second network host 1002. However, in the situation represented in FIG. 11, such data communications will fail because of the network failure 1102. However, as described above, the network hosts 1002, 1004 monitor the frequent transmissions of integrity messages sent from the other host such that the network failure 1102 can be detected very quickly (e.g., within a few seconds or less). In some examples, as soon as the network failure 1102 is detected, the communication path determiner 312 of the first network host 1002 defines a new communication path in which the second network interface 1012 is defined as a gateway for purposes of communications form the first network interface 1010 of the first network host 1002. As a result, communications originating from the first network interface 1010 of the first network host 1002 are routed (e.g., via internal routing 1104) to the second network interface 1012 and transmitted over the secondary network 1008. At the same time, in such examples, the communication path determiner 312 of the second network host 1004 similarly defines the second network interface 1012 as a gateway for purposes of communications associated with the first network interface 1010 of the second network host 1004. As a result, communications received at the second network interface 1012 of the second network host 1004 that are addressed to the first network interface 1010 are forwarded to the first network interface 1010 (e.g., via internal routing 1104). Thus, in the illustrated example of FIG. 11, there is one direct communication path and one indirect communication path between the network hosts 1002, 1004 as summarized in the table 1106.

Once the communication path determiner 312 establishes the new communication path as described above, data communications can resume between the first network interfaces 1010 of the first and second network hosts 1002, 1004. In some examples, the time between a network failure and the establishment of an alternate communication path is less than five seconds. In some examples it is less than two seconds. Accordingly, this is a significant improvement over existing methods that can take a minute or more to detect a network fault and then must establish a new communication path before data transmissions can begin again.

In some examples, although data communications are transmitted via the alternate communications path defined by the communication path determiner 312, integrity messages originating from the first network interface 1010 are still transmitted over the direct path defined by the primary network 1006. In such examples, as long as the network failure 1102 persists, the integrity message transmissions will not be successful. As such, the other host networks expecting such an integrity message will continue to confirm that the communication status is bad for the connection between the corresponding network interfaces. However, once the network failure is repaired, the next integrity message will be successfully delivered such that the network hosts receiving the message can confirm that the connection has been restored. In some examples, once a network host determines that a network failure is repaired (i.e., the communication status changes from bad to good), the communication path determiner 312 may adjust the IP routing table for the associated network interface to again transmit process control data over the direct path of the now repaired primary network 1006.

Figure 12:
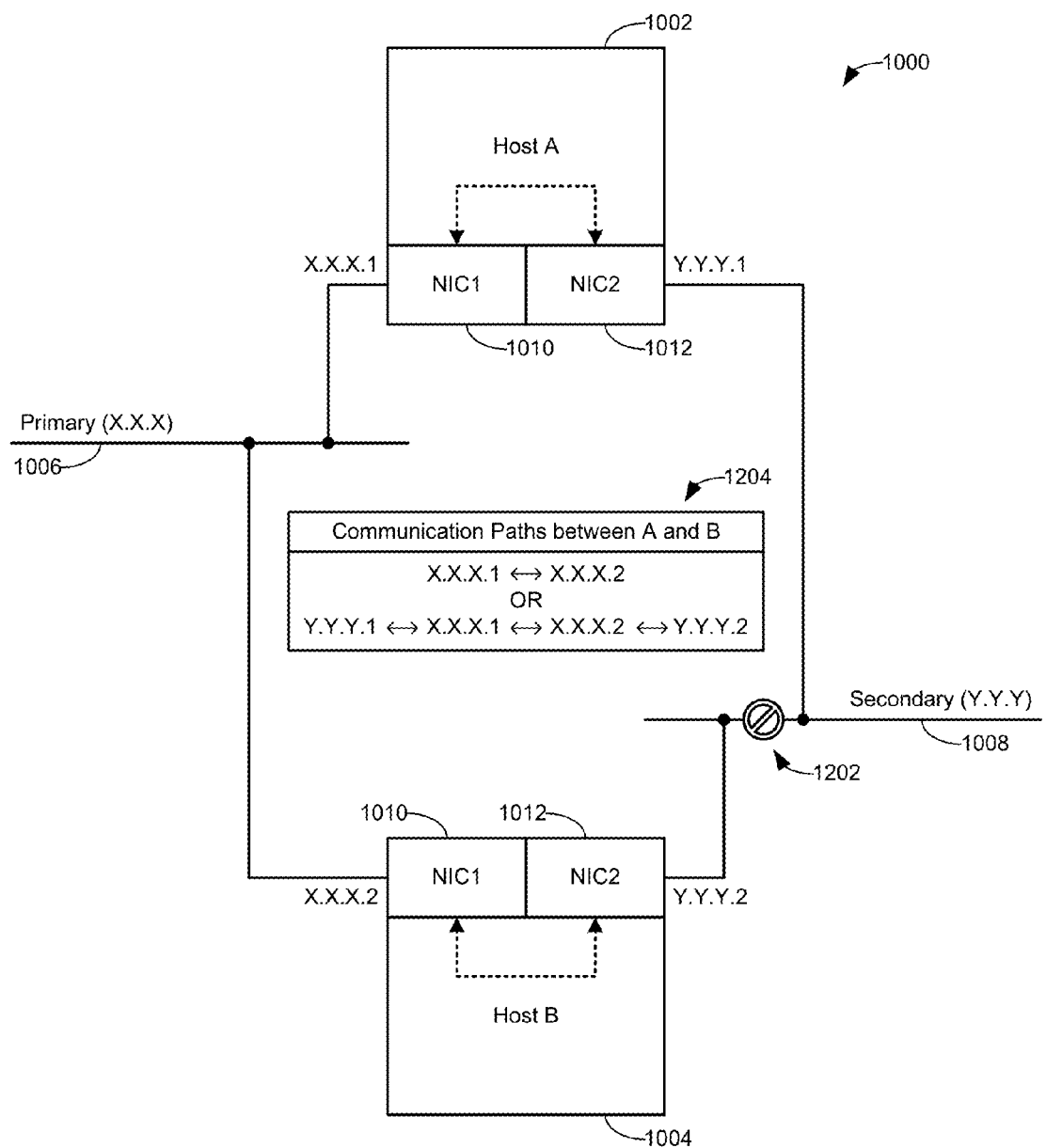

FIG. 12 illustrates the example system 1000 with a network failure 1202 in the secondary network 1008. In some examples, the detection and establishment of an alternate communication path between the secondary network interfaces 1012 of the network hosts 1002, 1004 is accomplished in the same manner as described above with respect to the network failure 1102 of FIG. 11 but with communications between the second network interfaces 1012 being rerouted through the primary network 1006. The table 1204 in FIG. 12 summarizes the direct and indirect communication paths resulting from the network failure 1202 of FIG. 12.

Returning to FIG. 3, the example network host 210 is provided with the example communications manager 314 to manage the transmission of the integrity messages from the network host 210. For example, the communications manager 314 controls when an integrity message is to be transmitted via the first network interface 302 and when an integrity message is to be transmitted via the second network interface 304. As described above, in some examples, the transmission of the integrity messages alternates between the first and second network interfaces 302, 304. In some examples, the communications manager 314 controls the timing of each integrity message so as to be within the time interval set for each successive message.

Additionally, in some examples, the communications manager 314 manages the transmission of data (e.g., process control data) from the network host 210 to any designated address on either network 408, 410. For example, the communications manager prepares data packets with the proper routing information to be transmitted to the correct destination. In some examples, when a network failure is first detected, the communications manager 314 causes any data intended to be communicated before the alternate path is established (typically only a few seconds) to be queued up for retransmission. Once the alternate path is established, any queued up data can be retransmitted along with any subsequent data. Accordingly, not only do the teachings disclosed herein detect and resolve network failures much faster than many known methods, the examples disclosed herein achieve the additional advantage of ensuring that no data is lost but will all be properly delivered.

While an example manner of implementing the host network 210 (corresponding to any of the workstations 117, the thin clients 126, the network hosts 402, 404, 406, and/or the network hosts 1002, 1004 of FIGS. 1-2, 4, 6, and/or 10-12) is illustrated in FIG. 3, one or more of the elements, processes and/or devices illustrated in FIG. 3 may be combined, divided, re-arranged, omitted, eliminated and/or implemented in any other way. Further, the example first network interface 302, the example second network interface 304, the example integrity message analyzer 306, the example integrity table generator 308, the example integrity message generator 310, the example communication path determiner 312, the example communications manager 314, the example alarm manager 316, and/or, more generally, the example network host 210 of FIG. 3 may be implemented by hardware, software, firmware and/or any combination of hardware, software and/or firmware. Thus, for example, any of the example first network interface 302, the example second network interface 304, the example integrity message analyzer 306, the example integrity table generator 308, the example integrity message generator 310, the example communication path determiner 312, the example communications manager 314, the example alarm manager 316, and/or, more generally, the example network host 210 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, first network interface 302, the example second network interface 304, the example integrity message analyzer 306, the example integrity table generator 308, the example integrity message generator 310, the example communication path determiner 312, the example communications manager 314, and/or the example alarm manager 316 is/are hereby expressly defined to include a tangible computer readable storage device or storage disk such as a memory, a digital versatile disk (DVD), a compact disk (CD), a Blu-ray disk, etc. storing the software and/or firmware. Further still, the example network host 210 of FIG. 3 may include one or more elements, processes and/or devices in addition to, or instead of, those illustrated in FIG. 3, and/or may include more than one of any or all of the illustrated elements, processes and devices.

Figure 13A:
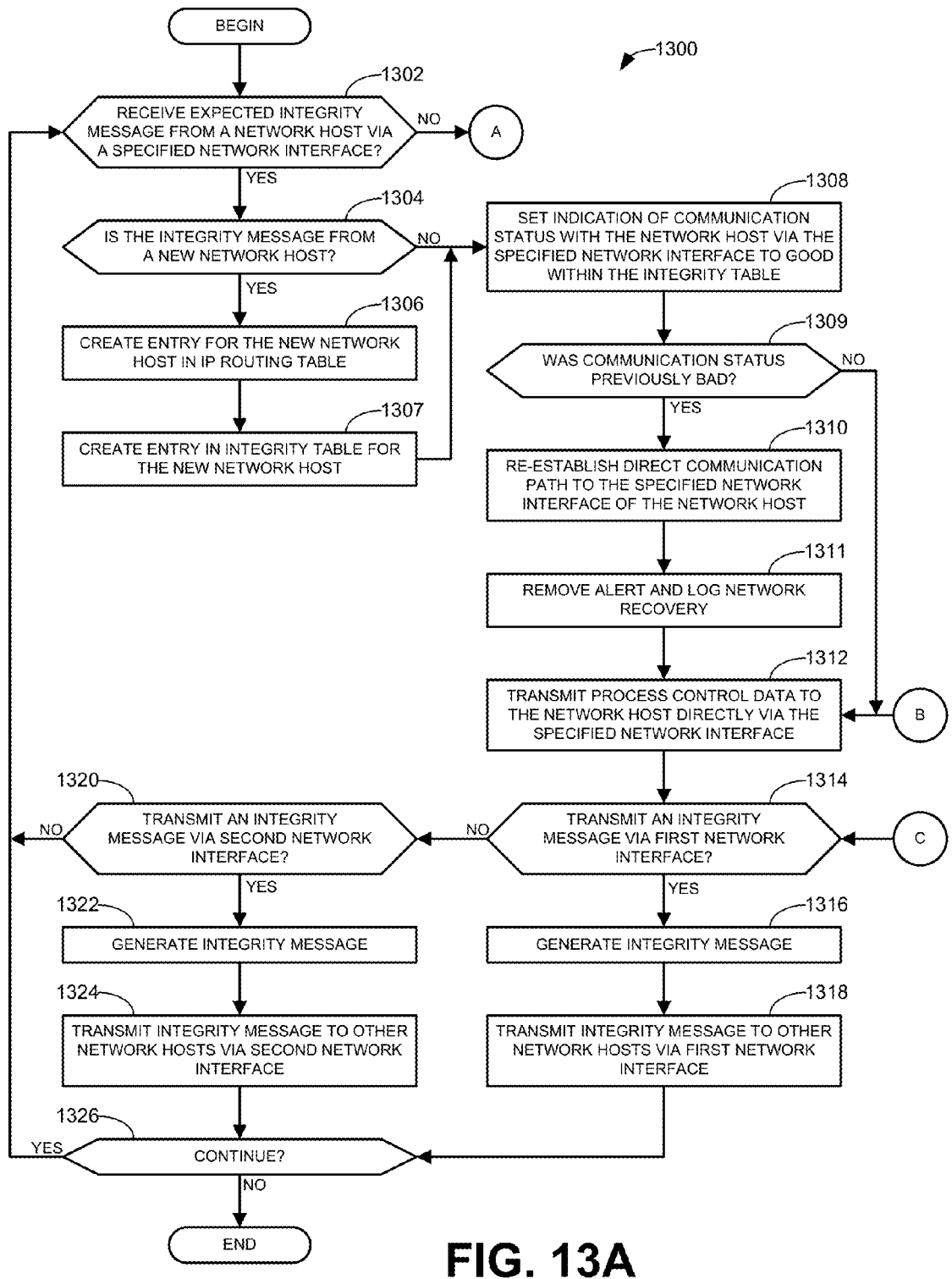
FIGS. 13A-B are a flowchart illustrating an example method to implement the example network hosts of FIGS. 1-4, 6, and/or 10-12 to provide redundancy between the network hosts.
Figure 13B:
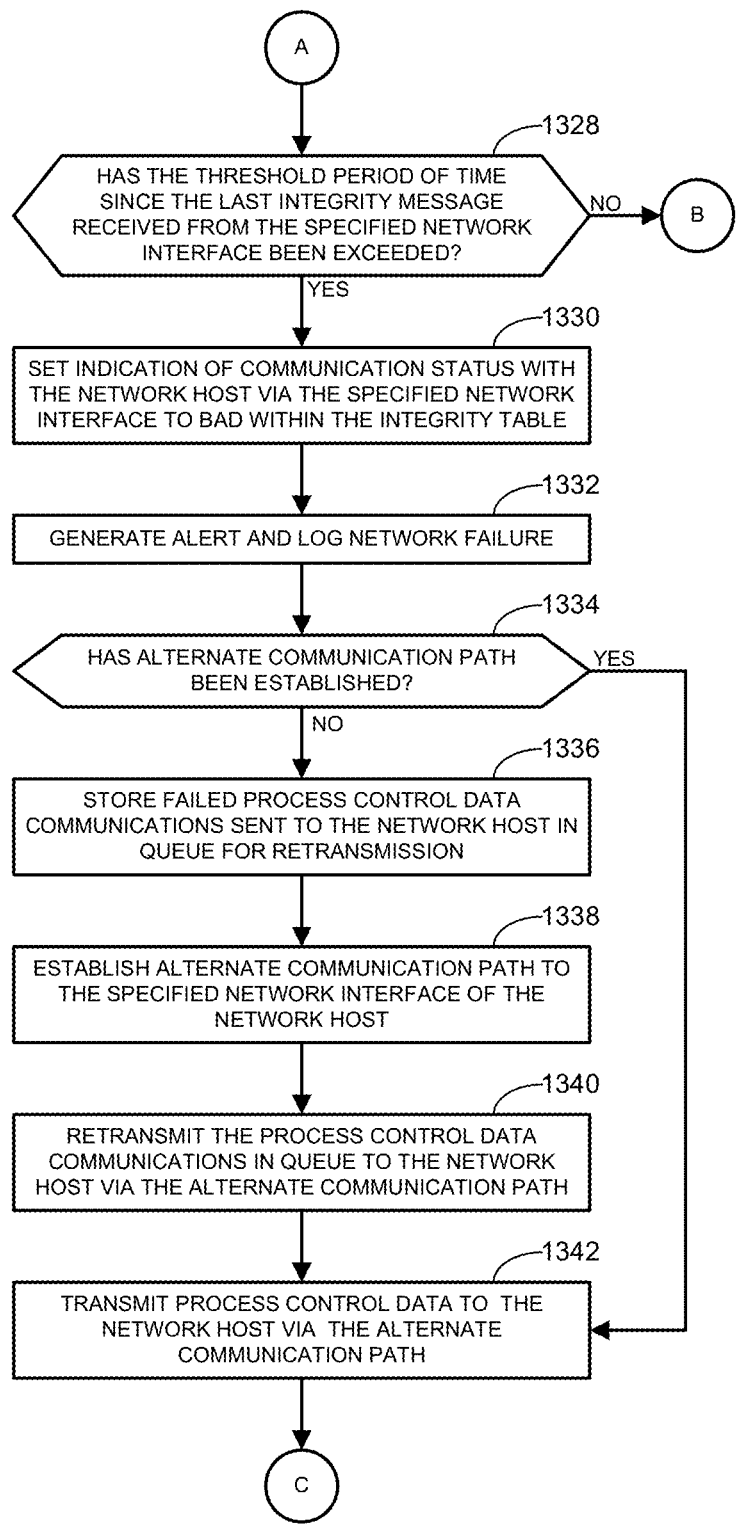

A flowchart 1300 representative of example methods for implementing the network host 210 of FIG. 3 is shown in FIGS. 13A and 13B. In this example, the methods may be implemented using machine readable instructions that comprise a program for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIGS. 13A and 13B, many other methods of implementing the example network host 210 may alternatively be used. For example, the order of execution of the blocks may be changed, and/or some of the blocks described may be changed, eliminated, or combined.

As mentioned above, the example processes of FIGS. 13A and 13B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 13A and 13B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method 1300 of FIGS. 13A and 13B begins at block 1302 where the example integrity message analyzer 306 determines whether an expected integrity message from a network host (e.g., other than the network host associated with the integrity message analyzer 306) is received via a specified network interface (e.g., either of the first or second network interfaces 302, 304). Whether the specified network interface corresponds to the first network interface 302 or the second network interface 304 depends on how the network hosts cycle through each of the network interfaces of each network host connected via two common networks. In some examples, an integrity message is expected based on a threshold period of time from when a last integrity message was received from the same network interface. In some examples, the threshold period of time corresponds to the duration of a single cycle through each of the network interfaces. In other examples, the threshold period of time is longer such as, for example, the duration of three cycles through each of the network interfaces.

If the integrity message analyzer 306 determines that an integrity message is received (block 1302) control advances to block 1304 where the example integrity message analyzer 306 determines whether the integrity message is from a new network host. The integrity message analyzer 306 determines such based on the host information included in the integrity message. If the host information identifies a network host from which the message analyzer 306 has not previously received an integrity message, the integrity message analyzer 306 determines the network host to be new. If the integrity message analyzer 306 determines the network host is new (block 1304), control advances to block 1306, where the example integrity message analyzer 306 creates an entry for the new network host in an IP routing table. At block 1307, the example integrity table generator 308 creates an entry in an integrity table for the new network host. At block 1308, the example integrity table generator 308 sets an indication of a communication status with the network host via the specified network interface to good within the integrity table. That is, because an integrity message was received (as determined at block 1302), the connection with the host network transmitting the integrity message is confirmed to be good and the integrity table is populated accordingly. Returning to block 1304, if the integrity message analyzer 306 determines the network host is not new, control advances directly to block 1308.

At block 1309, the example communication path determiner 312 determines whether the communication status was previously bad (set at block 1330 described below). If so, control advances to block 1310 where the example communication path determiner re-established the direct communication path (from the alternate communication path established at block 1338 described below) to the specified network interface of the network host. That is, if the communication status between the specified network interface and the network host was bad but is now indicated as good (i.e., the network connection was just repaired), the communication path determiner 312 may restore direct communications between the specified network interface and the network host from which the integrity message was received. In some examples, the communication path determiner 312 re-establishes the direct communication path by updating the IP routing information associated with the specified network interface to enable the direct transmission with other network hosts. At block 1311, the example alarm manager 316 removes an alert (generated at block 1332 described below) and logs the network recovery. Control then advances to block 1312. Returning to block 1309, if the example communication path determiner 312 determines that the communication status was not previously bad, control advances directly to block 1312.

At block 1312, the example communications manager 314 transmits process control data to the network host directly via the specified network interface. That is, the process control data is transmitted directly from the corresponding network interfaces over the associated network because communications over that path have been determined to be good.

At block 1314, the example communications manager 314 determines whether to transmit an integrity message via the first network interface 302. If so, control advances to block 1316 where the example integrity message generator 310 generates an integrity message. In some examples, the integrity message includes host information identifying the IP addresses of the first and second network interfaces 302, 304. Additionally, in some examples, the integrity message includes integrity information indicative of the communication status between each of the network interfaces 302, 304 and the corresponding network interfaces of other network hosts. At block 1318, the example communications manager 314 transmits the integrity message to the other network hosts via the first network interface 302. Control then advances to block 1326 to determine whether to continue the example method of FIGS. 13A and 13B. If so, control returns to block 1302 to repeat the process with a subsequent integrity message received. Otherwise, the example method of FIGS. 13A and 13B ends.

Returning to block 1314, if the example communications manager 314 determines not to transmit an integrity message via the first network interface 302, control advances to block 1320. At block 1320, the example communications manager 314 determines whether to transmit an integrity message via the second network interface 304. If the example communications manager 314 determines not to transmit an integrity message via the second network interface 304, control returns to block 1302. If the example communications manager 314 determines to transmit an integrity message via the second network interface 304, control advances to block 1322 where the example integrity message generator 310 generates an integrity message. At block 1324, the example communications manager 314 transmits the integrity message to the other network hosts via the second network interface 304. Control then advances to block 1326 to determine whether to return to block 1302 to repeat the method or to end the example method.

Returning to block 1302, if the integrity message analyzer 306 determines that an expected integrity message is not received, control advances to block 1328 where the example integrity message analyzer 306 determines whether the threshold period of time has been exceeded since the last integrity message was received from the specified network interface. If the threshold period of time has not been exceeded, control returns to block 1312 to transmit process control data. If the threshold period of time has been exceeded, control advances to block 1330. At block 1330, the example integrity table generator 308 sets the indication of the communication status with the network host via the specified network interface to bad within the integrity table. At block 1332, the example alarm manager 316 generates an alert and logs the network failure. In some examples, the alert is provided to an end user (e.g., an operator) to indicate that the network failure has occurred.

At block 1334, the example communication path determiner 312 determines whether an alternate communication path has been established (e.g., during a previous iteration of the example method). If so, control advances directly to block 1342 described below. If the example communication path determiner 312 determines that an alternate communication path has not been established, control advances to block 1336. At block 1336, the example communications manager 314 stores failed process control data communications sent to the network host (e.g., at block 1312) in a queue for retransmission. At block 1338, the example communication path determiner 312 establishes an alternate communication path to the specified network interface of the network host. In some examples, the alternate path relies on local routing within each of the source network host and the destination network host between the first and second network interfaces 302, 304. In such examples, the path is defined to pass over the network associated with the network interface other than the specified network interface.

Once the alternate communication path is established (block 1338), at block 1340, the example communications manager 314 retransmits the process control data communications in the queue to the network host via the alternate communication path. At block 1342, the example communications manager 314 transmits process control data (e.g., other than the data previously queued) to the network host via the alternate communication path. Control then advances to block 1314 to continue with the example method as described above.

Figure 14:
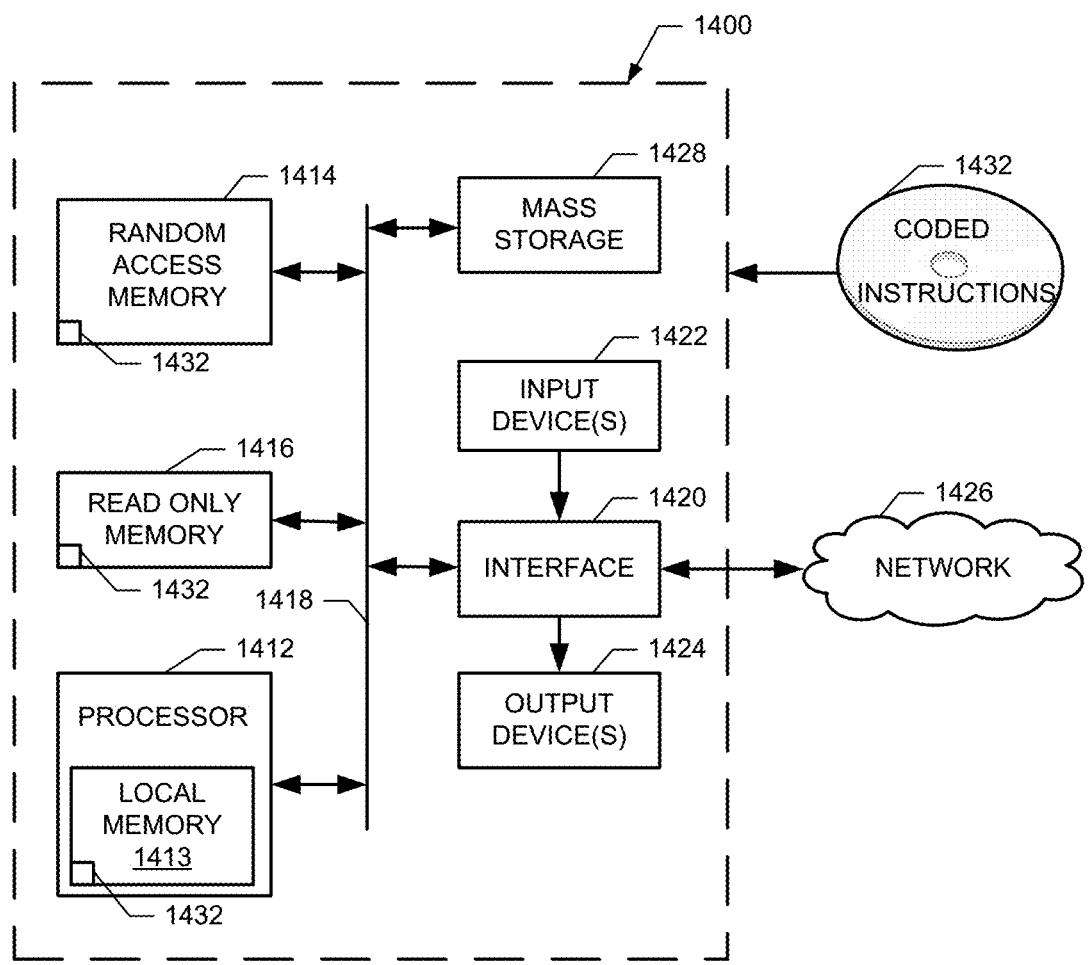
FIG. 14 is a schematic illustration of an example processor platform that may be used and/or programmed to carry out the example method of FIGS. 13A-B, and/or, more generally, to implement the example network hosts of FIGS. 1-4, 6, and/or 10-12.

FIG. 14 is a block diagram of an example processor platform 1400 capable of executing instructions to perform the methods of FIGS. 13A and 13B to implement the network host 210 of FIG. 3. The processor platform 1400 can be, for example, a server, a personal computer, a mobile device (e.g., a cell phone, a smart phone, a tablet such as an iPad™), a personal digital assistant (PDA), an Internet appliance, a DVD player, a CD player, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

Coded instructions 1432 to implement the methods of FIGS. 13A and 13B may be stored in the mass storage device 1428, in the volatile memory 1414, in the non-volatile memory 1416, and/or on a removable tangible computer readable storage medium such as a CD or DVD.

From the foregoing, it will appreciated that the above disclosed methods, apparatus and articles of manufacture provide a number of advantages over existing redundancy schemes used in process control systems (whether physically and/or virtually implemented). In particular, the examples disclosed herein do not rely on the cost and/or complexity associated with acquiring, configuring, and/or maintaining external hardware to facilitate the redundancy. Additionally, the examples disclosed herein are continuously monitoring the integrity of communication networks to detect failures and establish alternate communication paths in response to such failures much more quickly than other existing methods. Furthermore, the examples disclosed herein restore network connectivity in a sufficient amount of time to allow for the retransmission of data sent after a network failure such that no data is lost. Although there are some known approaches that provide reliable connections without losing data due to a network failure by sending all data twice over separate networks, the examples disclosed herein avoid the need for imposing such an additional load on the networks, thereby enabling more data to be transmitted and/or at faster rates.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
receiving, at a first network host, first integrity messages transmitted from a second network host over a first network, a timing of successive ones of the first integrity messages determined by the second network host regardless of whether the second network host receives communications from the first network host;
detecting, at the first network host, a network failure over a first communication path between a first network interface of the first network host and a first network interface of the second network host via the first network when the first network interface of the first network host fails to receive one of the first integrity messages expected from the first network interface of the second network host; and
automatically establishing a second communication path between the first network interface of the first network host and the first network interface of the second network host in response to the detected network failure.

2. The method of claim 1, wherein the second communication path is routed through a second network via a second network interface of the first network host and a second network interface of the second network host.

3. The method of claim 2, further comprising defining the second network interface of the first network host as a gateway for the first network interface of the first network host to enable data to be routed from the first network interface of the first network host to the second network interface of the first network host.

4. The method of claim 1, further comprising receiving, at the first network host, second integrity messages transmitted from the second network host over the second network.

5. The method of claim 4, wherein each of the first integrity messages and the second integrity messages comprises host information that identifies the second network host, the first network interface of the second network host, and a second network interface of the second network host.

6. A tangible computer readable storage medium comprising instructions that, when executed, cause a first network host to at least:
receive first integrity messages transmitted from a second network host over a first network, a timing of successive ones of the first integrity messages determined by the second network host regardless of whether the second network host receives communications from the first network host;
detect a network failure over a first communication path between a first network interface of the first network host and a first network interface of the second network host via the first network when the first network interface of the first network host fails to receive one of the first integrity messages expected from the first network interface of the second network host; and
automatically establish a second communication path between the first network interface of the first network host and the first network interface of the second network host in response to the detected network failure.

7. The storage medium of claim 6, wherein the second communication path is routed through a second network via a second network interface of the first network host and a second network interface of the second network host.

8. The storage medium of claim 7, wherein the instructions, when executed, further cause the first network host to define the second network interface of the first network host as a gateway for the first network interface of the first network host to enable data to be routed from the first network interface of the first network host to the second network interface of the first network host.

9. The storage medium of claim 6, wherein the second communication path is established less than five seconds after the network failure occurs.

10. The storage medium of claim 9, wherein the instructions, when executed, further cause the first network host to receive second integrity messages transmitted from the second network host over the second network.

11. The storage medium of claim 10, wherein each of the first integrity messages and the second integrity messages comprises host information that identifies the second network host, the first network interface of the second network host, and a second network interface of the second network host.

12. The storage medium of claim 11, wherein the instructions, when executed, further cause the first network host to:
detect the second network host on the first network based on the host information included in one of the first integrity messages; and
create an entry in a routing table to define the first communication path from the first network interface of the first network host to the first network interface of the second network host.

13. The storage medium of claim 10, wherein each of the first integrity messages and the second integrity messages comprises integrity information indicative of a communication status determined between the second network host and the first network host over each of the first network and the second network via the corresponding first and second network interfaces.

14. The storage medium of claim 13, wherein the integrity information further indicates a communication status determined between the second network host and other network hosts communicatively coupled to the first and second network hosts via the first and second networks.

15. The storage medium of claim 10, wherein the instructions, when executed, further cause the first network host to:
transmit third integrity messages over the first network; and
transmit fourth integrity messages over the second network, both the third integrity messages and the fourth integrity messages indicating a network failure between the first network interface of the first network host and the first network interface of the second network host over the first network in response to the detected network failure.

16. The storage medium of claim 6, wherein the instructions, when executed, further cause the first network host to:
generate at least one of an event, an alert, or an alarm in response to the detected network failure; and
log the at least one of the event, the alert, or the alarm.

17. The storage medium of claim 16, wherein the at least one of the event, the alert, or the alarm comprises information identifying the first network interface of the first network host and the first network interface of the second network host.

18. A system comprising a first network host including a processor and a memory, the processor to execute instructions stored on the memory to:
receive first integrity messages transmitted from a second network host over a first network, a timing of successive ones of the first integrity messages determined by the second network host regardless of whether the second network host receives communications from the first network host;
detect a network failure over a first communication path between a first network interface of the first network host and a first network interface of the second network host via the first network when the first network interface of the first network host fails to receive one of the first integrity messages expected from the first network interface of the second network host; and
automatically establish a second communication path between the first network interface of the first network host and the first network interface of the second network host in response to the detected network failure.

19. The system of claim 18, wherein the second communication path is routed through a second network via a second network interface of the first network host and a second network interface of the second network host.

20. The system of claim 19, wherein the instructions, when executed, further cause the first network host to define the second network interface of the first network host as a gateway for the first network interface of the first network host to enable data to be routed from the first network interface of the first network host to the second network interface of the first network host.

* * * * *